(12) United States Patent
Darapu et al.

(10) Patent No.: US 8,375,208 B2
(45) Date of Patent: Feb. 12, 2013

(54) METHOD AND APPARATUS FOR PROVIDING CONTENT AGGREGATION IN SUPPORT OF VIRTUAL CHANNELS

(75) Inventors: Raghu Darapu, Coppel, TX (US); Aravind Perumandla, Irving, TX (US); Ruchir Rodrigues, Dallas, TX (US); Shaygan Kheradpir, New York, NY (US); Santhosh Manjrekar, Irving, TX (US); Sivaramakrishnan Shunmugha, Irving, TX (US); Fang Zhu, Woburn, MA (US); Alexander Sakharov, Natick, MA (US); Sampath Nambakkam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 12/783,844

(22) Filed: May 20, 2010

(65) Prior Publication Data
US 2011/0289317 A1  Nov. 24, 2011

(51) Int. Cl.
*H04L 29/06* (2006.01)
*H04N 7/10* (2006.01)
*H04N 7/025* (2006.01)
*G06F 3/00* (2006.01)
*G06F 13/00* (2006.01)

(52) U.S. Cl. ............. 713/168; 725/38; 725/61; 709/250
(58) Field of Classification Search ..................... None
See application file for complete search history.

(56) References Cited

U.S. PATENT DOCUMENTS

| 2003/0014546 A1* | 1/2003 | Kikinis et al. ............ 709/250 |
| 2010/0175092 A1* | 7/2010 | Kikinis et al. ............ 725/61 |
| 2011/0197227 A1* | 8/2011 | Rouse et al. ............. 725/38 |

* cited by examiner

*Primary Examiner* — Shin-Hon Chen

(57) ABSTRACT

An approach is provided for content aggregation in support of virtual channels. Query information and authentication information of a user are received from a media application associated with a set-top box. A query request is generated for media content from a content provider using the query information, the authentication information, and an identifier of a service provider. Transmission of the query request is initiated to the content provider system. One or more search results are received in response to the query request. Transmission of the one or more search results is initiated to the media application.

17 Claims, 14 Drawing Sheets

METHOD AND APPARATUS FOR PROVIDING CONTENT AGGREGATION IN SUPPORT OF VIRTUAL CHANNELS

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. With readily available, cost-effective broadband services, bandwidth intensive applications, such as audio and video streaming, have become viable mediums. Unfortunately, little or no effort has been put forth to converge these distinct paths or enable seamless integration between traditional broadcast systems and broadband data networks to provide more robust content delivery systems.

Therefore, there is a need for an approach that can efficiently and effectively provide content aggregation in support of virtual channels.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing content aggregation in support of virtual channels are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1:
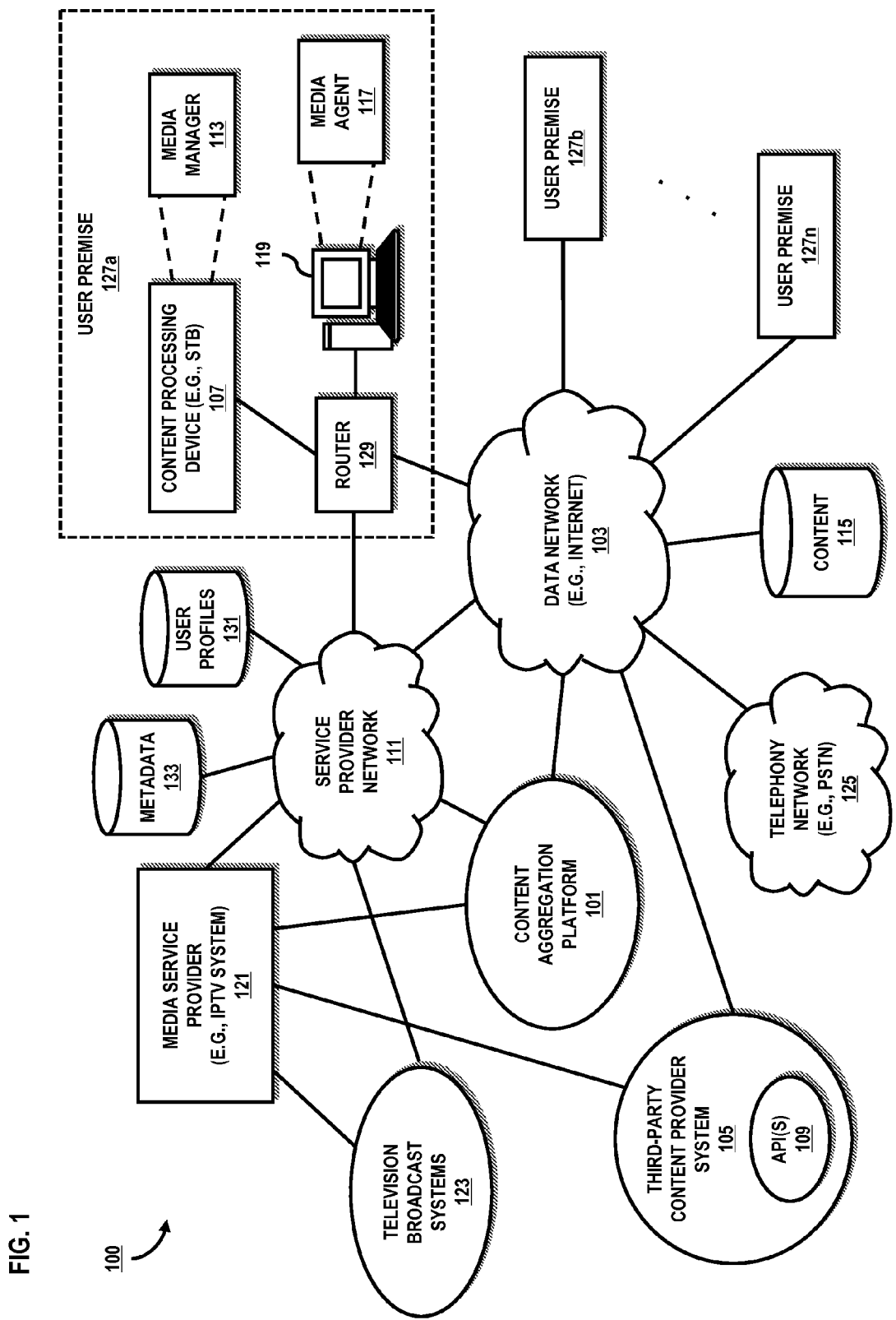
FIG. 1 is a diagram of a system capable of providing content aggregation in support of virtual channels, according to an exemplary embodiment.

FIG. 1 is a diagram of a system capable of providing content aggregation in support of virtual channels, according to an exemplary embodiment. For the purposes of illustration, system 100 is described with respect to content aggregation platform (or platform) 101 that is configured to aggregate searchable metadata relating to media/multimedia content (e.g., audio, video, and/or images) traditionally made available to consumers over one or more data networks 103 (e.g., the Internet) by third-party content providers, such as third-party content provider system 105. In this manner, system 100 may be configured to support presentation of this content through one or more "virtual channels" made accessible to subscribers (or users) via corresponding content processing devices 107, such as STBs, associated with the infrastructure of a television-based service provider. As such, a subscriber of a virtual channel service may seamlessly search the aggregated metadata, select content traditionally limited to the "data domains," and, thereby, tune into (or otherwise access) the selected content at, for example, a display device (not illustrated), such as a high-definition television (HDTV) set, communicatively coupled to content processing device 107. According to other exemplary embodiments, platform 101 may be configured to interface with one or more application programming interfaces (API) 109 of one or more third-party content provider systems 105 in order to facilitate subscriber interaction with their corresponding subscriber accounts associated with these third-party content provider systems 105. In this manner, platform 101 may be configured as an intermediary (or proxy) platform that enables subscribers to access the content-based services of these third-party content providers systems 105 that have been traditionally limited to the "data domains" via content processing devices 107. While specific reference will be made hereto, it is contemplated that system 100 may embody many forms and include multiple and/or alternative components and facilities.

It is observed that television remains the prevalent global medium for accessing entertainment and information-based content sources, as individuals spend a great deal of time tuning into televised media. Traditionally, television and radio programming, has been limited to broadcast media sources, e.g., media programs acquired "over-the-air" or via "cable" provider networks. Consumers, however, are being continually exposed to an ever increasing amount and variety of content accessible via "other" delivery systems (or infrastructures), such as via one or more data networks, e.g., the Internet. Further, with the advent of high-speed data networking connections, it is not uncommon for consumers to add to this body of available content by publishing libraries of end-user originated content, which is typically made available at, for instance, hosting sites, such as audio, video, and image-sharing sites. In fact, the growing popularity of "posting" (or otherwise sharing) content has given rise to entire industries permitting users to upload and make "homemade" content available via data networks and associated digital media devices. Not surprisingly, the consumer segment is being driven, at least in part, by a pervasive desire for access to a wide array of content in an "on-demand" fashion.

For example, internet protocol television (IPTV) service providers currently offer subscribers various content-based services ranging from multi-channel video programming that mimics traditional broadcast television, to true video-on-demand (VOD) programming. These services are further supplemented with interactive video applications that enable robust programming information, selection and navigation functionality, as well as integrated digital video recording, and data services that enhance the video experience. Even though these shared protocols create integrated value propositions with regard to content accessibility, consumers are becoming rather accustomed to the tool set of the Internet to "pull" customized content when desired, as opposed to receiving "pushed" content from linear broadcast sources or accessing "on-demand" content made available by traditional content producers based on their availability schedules. Thus, service providers, such as IPTV service providers, seeking to maximize average revenue per subscriber must look toward the synergistic characteristics of these two content-providing infrastructures to leverage upon the streaming services traditionally limited to the "data domains" in order to advance the availability of content and associated services offered through conventional television-based infrastructures. In adopting these advancements, however, the media industry faces a number of challenges hindering the convergence of broadband rich data content (e.g., traditional internet protocol (IP)-based content) with television infrastructures.

Subsequently, it is recognized that convenient access to third-party content provider systems will inevitably pave the way for new value-added services made available through conventional broadcast content provider infrastructures. Thus, the approach of system 100, according to certain exemplary embodiments, stems from the recognition that consumers can benefit from ability to experience via, for instance, STB-based environments, content that has been traditionally limited to the data domains, such as multimedia content. Little attention, however, has been afforded to extending and enhancing the accessibility of content within the entertainment arena, as well as among other commutations media. It is, therefore, apparent that improvements are needed to provide consumers with the ability to experience various forms of content the way they want, at any time they desire, using those devices designed to maximize the multimedia experience.

As such, system 100 includes service provider network 111 that is configured to integrate television-based media with that of the telecommunications, computing, and associated media environments, thereby broadening the scope of sources and technology available to consumers for obtaining media and/or multimedia content—hereinafter, collectively referred to as media content. In this manner, system 100 relieves network operators from the burden and expense of providing parallel avenues to content, by enabling users, via any suitable content processing device 107, e.g., an STB, to receive media content traditionally accessible over a data network 103, such as the Internet, through one or more dynamically provisioned virtual channels.

According to exemplary embodiments, media manager 113, which is implemented by content processing device 107, includes one or more computer program instructions (or code) that may be stored to, for example, one or more computer-readable mediums, e.g., one or more memories (not shown), of content processing device 107, that when executed by, for example, one or more processors (not illustrated) of content processing device 107, are configured to cause content processing device 107 at least to present content streamed from one or more third-party sources (e.g., third-party content provider system 105, content repository 115, etc.) available over one or more data networks 103 by, for instance, media agent 117. In this manner, media agent 117, which may be implemented by computing device 119, may also include one or more computer program instructions (or code) that may be stored to, for instance, one or more computer-readable mediums, e.g., one or more memories (not illustrated), of computing device 119, that when executed by, for example, one or more processors (not shown) of computing device 119, are configured to cause computing device 119 to retrieve content from the one or more third party sources, such as third-party content provider system 105, content repository 115, and the like, and stream the retrieved content to media manager 113 for presentation via content processing device 107. It is noted that media agent 117 may be configured to transcode (or otherwise convert) the retrieved content from a first format to a second format before or during streaming of the retrieved content to content processing device 107. This stream of content is referred to, herein, as a "virtual channel" of content.

In other exemplary embodiments, media manager 113 and/or media agent 117 may, when executed by, for instance, the one or more respective processors of content processing device 107 and/or computing device 119, be configured to cause content processing device 107 and/or computing device 119 to enable users to interface with platform 101 in order to easily, effectively, and intuitively locate and specify media content accessible over one or more data networks 103 for presentation via content processing device 107 as one or more virtual channels of content. Still further, media manager 113 and/or media agent 117 may, when executed by, for instance, the one or more respective processors of content processing device 107 and/or computing device 119, be configured to cause content processing device 107 and/or computing device 119 to enable users to access and, thereby, interact with one or more features associated with subscriber accounts corresponding to these third-party content provider systems 105. As such, embodiments of the service provider network 111 may also enable individuals utilizing content processing devices 107 to interact with one another, through personalized communications channels, to further facilitate the processes described herein. It is noted that media manager 113 and media agent 117 are described in more detail in association with FIG. 4.

As used herein, media content broadly includes any audiovisual content (e.g., broadcast television programs, VOD programs, pay-per-view programs, IPTV feeds, DVD related content, etc.), pre-recorded media content, data communications services content (e.g., commercials, advertisements, videos, movies, songs, images, sounds, etc.), Internet services content (streamed audio, video, or image media), and/or any other equivalent media form. In this manner, MSP 121 may provide (in addition to their own media content) content obtained from sources, such as one or more television broadcast systems 123, one or more third-party content provider systems 105, content residing in a networked repository 115, etc., as well as content available via one or more data networks 103 or telephony networks 125, etc.

MSP 121 can provide media content that is retrieved over data network(s) 103, as well as provide conventional media streams. For instance, MSP 121 may provide "virtual channels" to content traditionally limited to third-party content provider systems 105, such as host sites, e.g., end user originated content uploaded to and, thereby, shared via audio, video, and/or image sharing sites. Additionally, the media content may include streamed audio and/or video from conventional broadcast providers.

Media manager 113 and media agent 117 may be executable, for example, as one or more user interfaces capable of local implementation on content processing device 107 or on a computing device 119, such as a computer, telephony device, mobile device, and/or any other like user device. Thus, exemplary embodiments of media manager 113 and media agent 117 may be provided through navigation shell applications, e.g., menu applications having options corresponding to different functions. By way of example, computer devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data. Moreover, content processing device 107 may be used alone or in combination with one or more computing devices 119 to implement various exemplary embodiments.

Content processing devices 107 and/or computing device 119 may be configured to communicate using one or more of networks 103, 111, and 125. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 107 to various sources of media content, such as one or more third-party content provider systems 105. Although depicted in FIG. 1 as separate networks, data network 103 and/or telephony network 125 may be completely or partially contained within service provider network 111. For example, service provider network 111 may include facilities to provide for transport of packet-based and/or telephony communications.

By way of example, content processing devices 107, as well as computing device 119, may be configured to remotely access one or more servers (not shown), via corresponding communication interfaces (not illustrated), that are configured to execute multiple instances of either media manager 113 or media agent 117. That is, these media applications may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, the aforementioned server may be an "online" system capable of communicating with one or more third-party web servers (not illustrated), content repositories (e.g., repository 115), or equivalent facilities, to provide users various avenues to locate, specify, search, select, receive, and/or share media content that is accessible over one or more data networks 103, such as made accessible via third-party content provider system 105. For example, exemplary embodiments of media applications may comprise hypertext markup language (HTML) user interfaces or JAVA™ applets stored to the server and accessed via world-wide-web pages. These interfaces are particularly useful in extending system 100 functionality to devices having limited resources (e.g., PDAs, handsets, thin-clients, etc.). In alternative embodiments, the server may be collocated with and/or integrated into MSP 121. As such, multiple users, interfaces, and instances of media applications can be simultaneously realized through system 100.

According to other embodiments, media manager 113 and media agent 117 may be configured to communicate over one or more local area networks corresponding to user premises 127a-127n that are facilitated by way of corresponding "home" routers 129. In this manner, routers 129 may be used for establishing and operating, or at least connecting to, a network such as a "home" network or LAN, and is used to route communications within user premises 127a-127n. It is noted that routers 129 may provide for network connectivity not only for one or more computing devices 119, but also for network connectivity for content processing device 107. For example, content processing device 107 may be a set-top box communicatively coupled to router 129 via coaxial cable, whereas computing devices 119 may be connected to router 129 via wireless connection, a network cable (e.g., ethernet cable), and/or the like. It is noted, however, that in certain embodiments content processing device 107 may be configured to establish connectivity with router 129 via one or more wireless connections. Further, content processing device 107 and computing device 119 may be uniquely identified by router 129 via any suitable addressing scheme. For example, router 129 may utilize the dynamic host configuration protocol (DHCP) to dynamically assign "private" DHCP internet protocol (IP) addresses to content processing device 107 and computing devices 119, i.e., IP addresses that are accessible to devices such as devices 107 and 119 that are part of a LAN facilitated via router 129, i.e., connected to router 129.

Accordingly, it is noted that user premises 127a-127n may be geospatially associated with one or more regions. As such, content processing devices 107 associated with these user premises 127a-127n may be configured to communicate with and receive signals and/or data streams from MSP 121 (or other transmission facility, e.g., third-party content provider system 105) in response to processes of one or more of media manager 113 and media agent 117. These signals may include media content retrieved over a data network (e.g., service provider network 111, data network 103, and/or telephony network 125), as well as conventional video broadcast content.

MSP 121 can include one or more media content servers (not illustrated) and/or data repositories (not shown). Alternatively, user profile repository 131, content repository 115, or the aforementioned server may be accessed via one or more of service provider network 111 and/or data networks 103. Further, service provider network 111 may include a system administrator (not shown) for operational and management functions to deploy the virtual channel services using, for instance, an internet protocol television (IPTV) system. In this manner, content processing devices 107 may utilize any suitable technology to draw, receive, and/or transmit media content from/to MSP 121 or any other suitable content source/sink, such as third-party content provider system 105. A more detailed explanation of an exemplary content processing device is provided with respect to FIG. 3.

In an exemplary embodiment, content processing devices 107 may draw, receive, and/or transmit content from (or to) multiple sources, thereby alleviating the burden on any single source, e.g., MSP 121, to gather, supply, or otherwise meet the content demands of any user or premise. Thus, particular embodiments enable authenticated third-party television broadcast systems 123, third-party content provider systems 105, and servers (not shown) to transmit media content accessible over a data network 103 to content processing devices 107 either apart from, or in conjunction with, MSP 121. Such media content may include media regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

The media content may be distinguished (or otherwise categorized) utilizing metadata included therewith or appended thereto. Metadata can be generally considered data about data; but more specifically, it can be utilized to describe all aspects of, and media content distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes. According to certain embodiments, content aggregation platform 101 may be configured to aggregate and maintain one or more repositories, e.g., metadata repository 133, of this metadata for users to search and receive media content from one or more third-party content provider systems 105, or any other suitable source.

In particular embodiments, system 100 may structure and encode metadata to describe characteristics of the content-bearing entities to aid in the identification, discovery, assessment, and management of the media content by media manager 113 and/or media agent 117. For example, the metadata can be used to optimize compression algorithms or perform other computational tasks by the components of system 100. The metadata might be utilized to share media content among a plurality of content processing devices 107. Various other embodiments might use metadata to provide search results, suggest media content sources of interest to a user based on information stored in a user profile, and the like. A more detailed explanation of user profiles is provided with respect to FIG. 3.

In various embodiments, service provider network 111 may include one or more video and/or audio processing modules (not shown) for acquiring and transmitting content feeds (including media content accessible over a data network) from MSP 121, the television broadcast systems 123, the third-party content provider systems 105, or servers (not shown) over one or more of the networks 103, 111, and 125, to particular content processing devices 107. As such, service provider network 111 may include facilities to support compression/decompression, coding/decoding, modulation/demodulation, optical/electrical conversion, and analog/digital conversion, as well as any other suitable signal processing and/or transmission operation. Further, service provider network 111 may optionally support end-to-end data encryption in conjunction with media content streaming services such that only authorized users are able to experience content and interact with other legitimate users/sources.

Accordingly, system 100 may include an authentication module (not shown) configured to perform authorization/authentication services and determine whether users or content sources are indeed subscribers to, or providers of, the virtual channel service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., media content streaming instances). Data packets, such as cookies, may be utilized for this purpose; however, other authentication information may be utilized, such as described below. Thus, once a content processing device 107 and/or source is authenticated, connections between content processing devices 107 and the content sources may be established directly or through MSP 121 and/or computing device 119.

In other embodiments, authentication procedures on a first device (e.g., content processing device 107) may identify and authenticate a second device (e.g., computing device 119) communicatively coupled to, or associated with, the first device. Further, the authentication module may grant users the right to receive media content from multiple system 100 sources by revoking existing sets of digital certificates associated with a particular provider, and issuing new sets of digital certificates mapped to a second provider. In this regard, a content processing device 107 may receive new media content from a second source, whereas the previous session may be automatically closed when the "old" or prior certificates associated with the first source are revoked. This enables users to initiate secure sessions at any given content processing device 107 (or computing device 119) linked to system 100, whether or not the content processing device (or computing device) belongs to that individual user. It is additionally contemplated that multiple rights sessions may exist concurrently.

In particular embodiments, MSP 121 may comprise an IPTV system configured to support the transmission of television video programs from the broadcast systems 123 as well as other content, such as media content from the various third-party sources (e.g., 105, 115, and 123) utilizing internet protocol (IP). That is, the IPTV system 121 may deliver signals and/or streams, including media content accessible over a data network, in the form of IP packets. Further, the transmission network (e.g., service provider network 111) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of media content (including content accessible over data networks). Delivery of video content, by way of example, may be through a unicast or multicast from the IPTV system 121 (or third-party content provider system 105, computing device 119, etc.) to the content processing devices 107. Any individual content processing device 107 may tune to a particular source, e.g., virtual channel, by simply joining a multicast (or unicast) of the media content, utilizing an IP group membership protocol (IGMP). For instance, the IGMP v2 protocol may be employed for joining content processing devices to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the media content, in the form of virtual channels, may be provided to various IP-enabled devices, such as those computing, telephony, and mobile apparatuses previously delineated.

As such, exemplary content processing devices 107 (e.g., STBs) may integrate all the functions of an IPTV system, as well as combine the media content functions of the various online or off-line environments, in a manner that seamlessly toggles among the various system 100 resources. It is contemplated that the virtual channel service may be extended to users with a presence on the Internet. In alternative embodiments, the services of system 100 could be extended to users having an end terminal (not shown), such as a plain old telephone service (POTS) device, connected to the telephony network 125. While system 100 is illustrated in FIG. 1, the exemplary components are not intended to be limiting, and indeed, additional or alternative components and/or implementations may be utilized.

Figure 2:
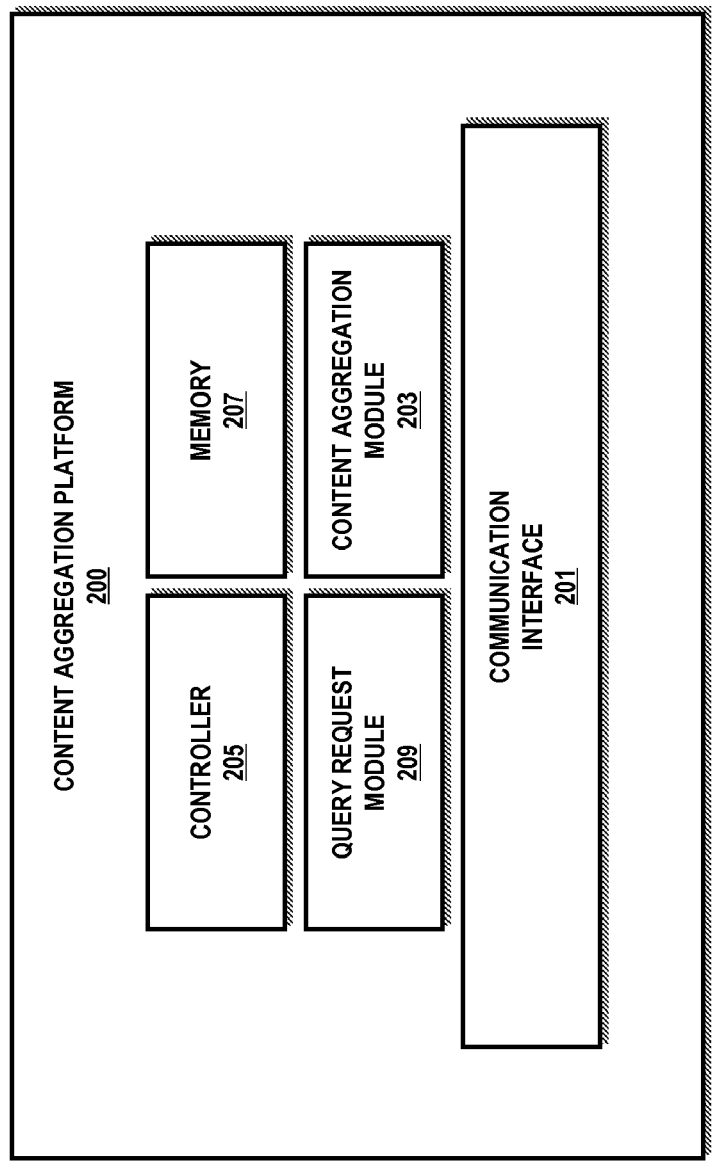
FIG. 2 is a diagram of a platform configured to facilitate content aggregation in support of virtual channels, according to an exemplary embodiment.

FIG. 2 is a diagram of a platform configured to facilitate content aggregation in support of virtual channels, according to an exemplary embodiment. Content aggregation platform (or platform) 200 may comprise computing hardware (such as described with respect to FIG. 13), as well as include one or more components configured to execute the processes described herein for facilitating content aggregation in support of virtual channels. In one implementation, platform 200 includes communication interface 201, content aggregation module 203, controller 205, memory 207, and query request module 209. It is noted that platform 200 may communicate with one or more media applications, such as media manager 113 and/or media agent 117. Platform 200 may also communicate with one or more third party content provider systems 105 and/or one or more user devices, such as computing device 119 and content processing device 107. While specific reference will be made to this particular implementation, it is also contemplated that platform 200 may embody many forms and include multiple and/or alternative components. For example, it is contemplated that the components of platform 200 may be combined, located in separate structures, and/or separate locations.

In exemplary embodiments, content aggregation module 203 may be configured to maintain one or more networked repositories, e.g., repository 133, of aggregated metadata relating to media content available via a plurality of third-party content provider systems 105. For instance, the metadata may relate to thumbnails, uniform resource locators, titles, addressing information, descriptions, sources, ratings, tags, durations, media types, publishing dates, number of views, height, width, size, author, etc. As such, users via, for instance, media manager 113 and/or media agent 117 may be configured to search the networked repositories for media content, receive one or more search results relating to media content available from, for example, one or more third-party content provider systems 105, and select certain search results for streaming associated media content over at least one data network 103 to computing device 119 and/or content processing device 107 for presentation.

According to certain embodiments, platform 200 may not be permitted to (or may simply not) maintain metadata associated with the media content made available via one or more third-party content provider systems 105. As such, query request module 209 is configured to receive query information and authentication information of a user from a media application (e.g., media manager 113 and/or media agent 117) associated with, for instance, content processing device 107, such as set-top box, and generate a query request for media content from one or more third-party content provider systems 105 using the query information, the authentication information, and an identifier of a service provider of system 100. In this manner, query request module 209 may be configured, in conjunction with communication interface 201, to initiate transmission of the query request to the one or more third-party content provider systems 105 and, thereby, receive one or more search results in response to the query request. It is noted that query request module 209 via, for example, communication interface 201 may also be configured to initiate transmission of the one or more search results to the media application for presentation via content processing device 107 and/or computing device 107. Exemplary processes, user interfaces, and the features of platform 200 are more fully described with respect to FIGS. 6-11.

Additionally, platform 200 may include one or more controllers (or processors) 205 for effectuating the aforementioned features and functions of platform 200, as well as one or more memories 207 for permanent and/or temporary storage of one or more of the aforementioned variables, parameters, information, signals, messages, identifiers, addresses, locators, etc. In this manner, the features and functions of platform 200 may be executed by platform 200, such as in response to controller(s) 205 (or other components of platform 200) executing computer program code (or other instructions) stored to one or more memories 207.

Figure 3:
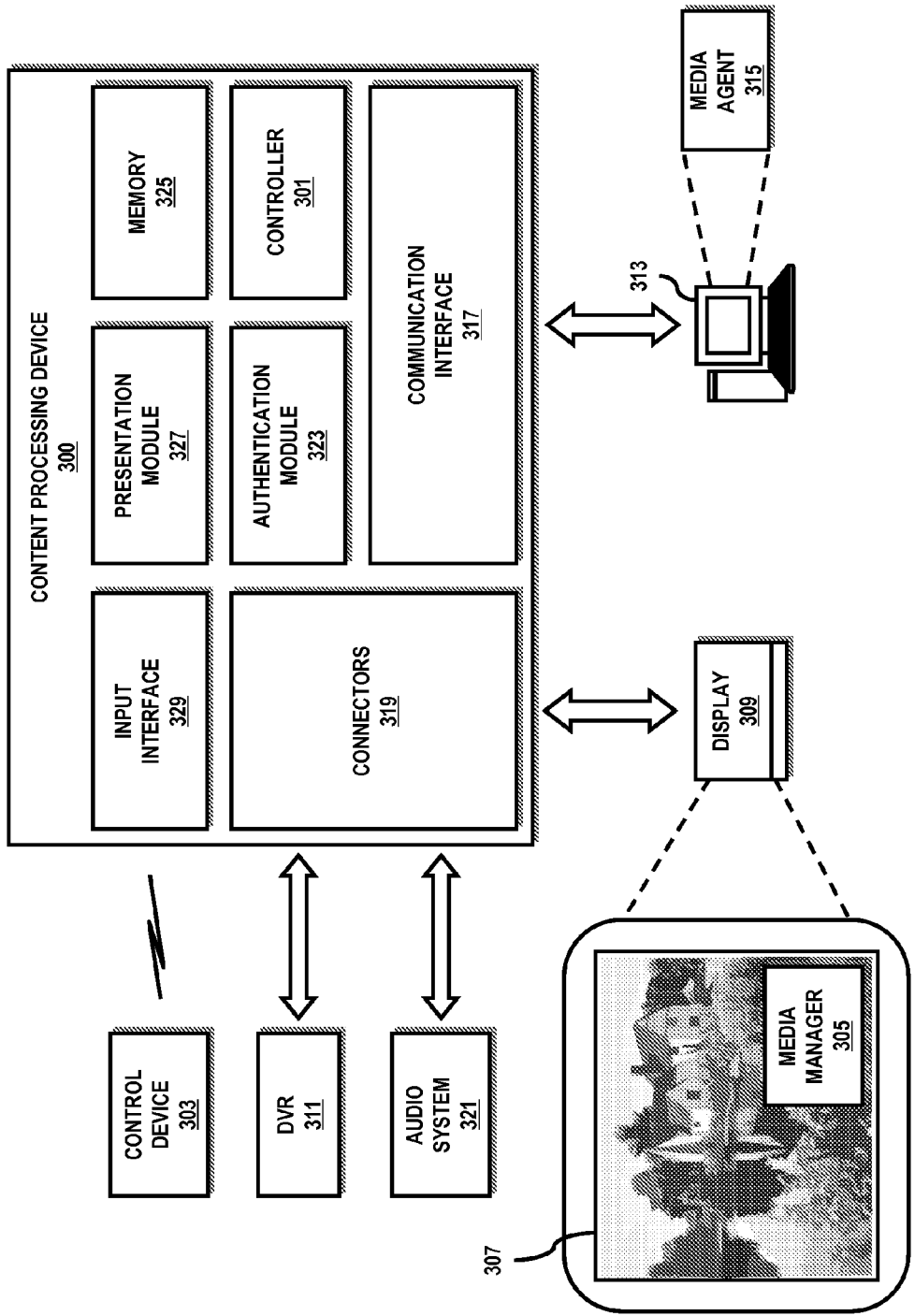
FIG. 3 is a diagram of a content processing device configured to facilitate content aggregation in support of virtual channels, according to an exemplary embodiment.

FIG. 3 is a diagram of a content processing device configured to facilitate content aggregation in support of virtual channels, according to an exemplary embodiment. Content processing device (or device) 300 may comprise any suitable technology to receive one or more content streams from a media source, such as MSP 121 and one or more third-party content provider systems 105. The content streams include media content retrieved over one or more data networks 103, in response to commands from one or more media applications, such as media manager 113 and/or media agent 117.

Accordingly device 300 may comprise computing hardware (such as described with respect to FIG. 13) and include additional components configured to provide specialized services related to the reception and display of media content, such as one or more remote control capabilities, conditional access functions, tuning functions, presentation functions, multiple network interfaces, audio/video signal ports, and the like. Alternatively (or additionally), the functions and operations of device 300 may be governed by one or more controllers 301 that interacts with the components of device 300 to provide media content retrieved from, for example, third-party media content provider system 105 or any other suitable component or facility of system 100. In turn, a user may be afforded greater functionality utilizing a control device 303 to control these services, functions, interfaces, etc., as will be more apparent below.

As such, device 300 may be configured to process a content stream, including causing media application (e.g., media manager 305) and/or one or more components of the media content (e.g., video component 307 and/or an audio component) to be presented on (or at) display 309. Presentation of the media content may include: displaying, recording, playing, rewinding, forwarding, toggling, selecting, zooming, or any other processing technique that enables users to experience one or more content streams. For instance, device 300 may provide one or more signals to display 309 (e.g., a television set) so that display 309 may present (e.g., display) media manager 305 overlaid on the media content (e.g., video 307) to a user, wherein the media content includes content retrieved over one or more data networks 103, such as from third-party content provider system 105.

Device 300 may also interact with a PVR, such as digital video recorder (DVR) 311, to store received signals that can then be manipulated by a user at a later point in time. In various embodiments, DVR 311 may be network-based, e.g., included as a part of service provider network 111, collocated at a subscriber site (e.g., user premise 127a) having connectivity to device 300, and/or integrated into device 300. Display 309 may present media content provided via device 300 to a user. In alternative embodiments, device 300 may be configured to communicate with a number of additional peripheral devices, including: computing device 313, laptops, PDAs, cellular phones, monitors, mobile devices, handheld devices, as well as any other equivalent technology capable of presenting media content to a user, such as those computing, telephony, and mobile user devices described with respect to FIG. 1.

These peripherals may be configured to implement instances of media manager 305 to access media content stored and/or processed by device 300. For example, a media content stream may be received by device 300 and recorded by DVR 311, wherein computing device 313 may later access and view the stored content. Moreover, the peripheral devices may be configured to program or otherwise control various functions of device 300. For instance, a media application (e.g., media agent 315) executed via computing device 313 may receive input from a user specifying media content that is accessible via third-party content provider system 105. As such, a communication interface (not illustrated) of computing device 313 may be configured to retrieve the media content over one or more data networks 103, transcode the media content (in certain instances) and, thereby, stream the media content to device 300 for presentation. As such, device 300 may receive a media content stream from computing device 313 to present to a user via display 309.

In another embodiment, user input to device 300 and/or a peripheral device (e.g., computing device 313) executing an instance of a media manager application may cause one or more search results to be received and, thereby, made available to device 300 or another content processing device, computing device, telephony device, or mobile device capable of processing audio and/or video streams associated with the search results. Still further, user input to a media application, such as media manager 305 and/or media agent 315, may be configured to program or otherwise control the functions of device 300. For instance, a user may access media agent 315 via computing device 313 and, thereby, search for, locate, select, and/or specify media content to be retrieved over one or more data networks 103 and, thereby, streamed to device 300, or any other suitable user device. In this manner, third-party content provider system 105 (and other components/facilities of system 100, such as MSP 121) may, when suitable, transmit (e.g., stream) specified media content to device 300 for presentation via display 309.

Furthermore, device 300 may include communication interface 317, which may be configured to receive content streams from an MSP 121, computing device 313, and/or other media content sources, such as third party content provider system 105. Communication interface 317 may optionally include single or multiple port interfaces. For example, device 300 may establish a broadband connection to multiple sources transmitting content to device 300 via a single port, whereas in alternative embodiments, multiple ports may be assigned to the one or more sources. In still other embodiments, communication interface 317 may be configured to permit users, via device 300, to transmit data (including media content) to third-party content provider systems 105, to other users with content processing devices, MSP 121, and/or any other suitable media content source/sink.

According to various embodiments, device 300 may also include inputs/outputs (e.g., connectors 319) to display 309 and DVR 311, as well as to audio system 321. In particular, audio system 321 may comprise a conventional audio-video receiver capable of monaural or stereo sound, as well as multichannel surround sound. Audio system 321 may include speakers, ear buds, headphones, or any other suitable component configured for personal or public dissemination. As such, device 300, display 309, DVR 311, and audio system 321, for example, may support high resolution audio and/or video streams, such as high definition television (HDTV) or digital theater systems high definition (DTS-HD) audio. Thus, device 300 may be configured to encapsulate data into a proper format with required credentials before transmitting onto one or more of the networks of FIG. 1 and de-encapsulate incoming traffic to dispatch data to display 309 and/or audio system 321.

In an exemplary embodiment, display 309 and/or audio system 321 may be configured with internet protocol (IP) capability (i.e., includes an IP stack, or is otherwise network addressable), such that the functions of device 300 may be assumed by display 309 and/or audio system 321. In this manner, an IP ready, HDTV display or DTS-HD audio system may be directly connected to one or more service provider networks 111, data networks 103, and/or telephony networks 125. Although device 300, display 309, DVR 311, and audio system 321 are shown separately, it is contemplated that these components may be integrated into a single component, or other combination of components.

An authentication module 323 may be provided by device 300 to initiate or respond to authentication schemes of, for instance, service provider network 111, third-party content provider systems 105, or various other content providers, e.g., broadcast television systems 123, etc. Authentication module 323 may provide sufficient authentication information, e.g., a user name and password, a key access number, a unique machine identifier (e.g., MAC address), and the like, as well as combinations thereof, to a corresponding network interface for establishing connectivity, such as router 129. As described earlier, one or more digital certificates may be simultaneously mapped. Moreover, authentication at device 300 may identify and authenticate a second device (e.g., computing device 313) communicatively coupled to, or associated with, device 300, or vice versa. Further, authentication information may be stored locally at memory 325, in a repository (not shown) connected to device 300, or at a remote repository, e.g., user profile repository 131.

Authentication module 323 may also facilitate the reception of data from single or disparate sources. For instance, device 300 may receive broadcast video from a first source (e.g., MSP 121), signals from a media application at second source (e.g., computing device 313), and a media content stream from a third source accessible over data networks 103 (e.g., third-party content provider system 105). As such, display 309 may present the broadcast video, media application, and media content stream to the user, wherein device 300 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 323 can authenticate a user to allow them to interact with one or more third-party subscriber account features associated with third-party content provider systems 105.

Presentation module 327 may be configured to receive media content streams (e.g., audio/video feed(s) including media content retrieved over a data network) and output a result via one or more connectors 319 to display 309 and/or audio system 321. In this manner, presentation module 327 may also provide a user interface for a media application via display 309. Aural aspects of media applications may be presented via audio system 321 and/or display 309. In certain embodiments, media applications, such as media manager 305, may be overlaid on the video content output 307 of display 309 via presentation module 327.

In any case, however, the media content streams may include content received in response to user input specifying media content that is accessible by way of one or more third party content provider systems 105 and, thereby, available over at least one data network 103, wherein the media content may be retrieved by media agent 315 and streamed to device 300 for presentation via display 309 and/or audio system 321. Accordingly, presentation module 327 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

Connector(s) 319 may provide various physical interfaces to display 309, audio system 321, as well as other peripherals; the physical interfaces may include, for example, RJ45, RJ11, high definition multimedia interface (HDMI), optical, coax, FireWire, wireless, and universal serial bus (USB), or any other suitable connector. The presentation module 327 may also interact with control device 303 for determining particular media content that a user desires to experience. In an exemplary embodiment, control device 303 may comprise a remote control (or other access device having control capability, such as computing device 313, a wireless user device, mobile phone, etc.) that provides users with the ability to readily manipulate and dynamically modify parameters affecting the media content being viewed. In other examples, device 300 may be configured for voice recognition such that device 300 may be controlled with spoken utterances.

In this manner, control device 303 may include (not shown) a cursor controller, trackball, touch screen, touch pad, keyboard, and/or a key pad for activating a media application, navigating through broadcast channels, search results, and/or media content identifiers, as well as performing other control functions. For instance, control device 303 may be utilized to maximize a media application, navigate through displayable interfaces, locate/specify/retrieve media content, modify device 300 parameters, or toggle through broadcast channels and/or media content identifiers. Control device 303 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, control device 300 may comprise a memory (not illustrated) for storing preferences affecting media content viewed, which can be conveyed to device 300 through an input interface 329. Input interface 329 may support any type of wired and/or wireless link, e.g., infrared, radio frequency (RF), BLUETOOTH, and the like. Thus, control device 303 may store user preferences with respect to media content, such as favorite sources, etc. Alternatively, user preferences may be tracked, recorded, or stored at device 300 or at a network user profile repository 131. The preferences may be automatically retrieved and activated by a user at any time. It is noted that control device 303 may be separate from device 300 or may be integrated within deice 300, in which case certain input interface hardware and/or software may be superfluous.

Particular embodiments enable users, via control device 303, to populate or otherwise configure a user profile. For instance, a user profile application may be provided or accessed by device 300 to enable users to populate a plurality of entry fields with user information. A user profile may include one or more customized or personalized settings that affect any aspect of media content accessible via device 300. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible media content sources/subjects, a "blacklist" specifying one or more media content sources/subjects, as well as other equivalent customized settings, such as color schemes, sound effects, etc.

In other embodiments, the user profile may be established using the additional access devices described earlier, e.g., computing device 313, etc. As such, user profile information may be stored at device 300, e.g., at memory 325, and/or at a user site repository (not illustrated) directly connected to device 300. Additionally or alternatively, profile information may be stored in a network-based repository (e.g., remote user profile repository 131), control device 303, and/or any other storage medium. Similarly, device 300 (via memory 325), a user site repository, and/or a network-based repository may store a "MY CONTENT" collection of digital audio, video and/or image content accumulated by a user. This collection may also include a plurality of identifiers, links, search results, or bookmarks to media content accessible over one or more data networks 103, wherein selection of a particular identifier, link, search result, or bookmark may cause one or more media applications to obtain the content from an associated link (either directly from a data network source (e.g., content repository 115) or indirectly from third-party content provider system 105 and/or MSP 121).

Thus, under the arrangements of FIGS. 1-3, a user may experience (e.g., search for, locate, specify, and receive), as well as share (e.g., upload) media content including media content retrieved over one or more data networks 103.

Figure 4:
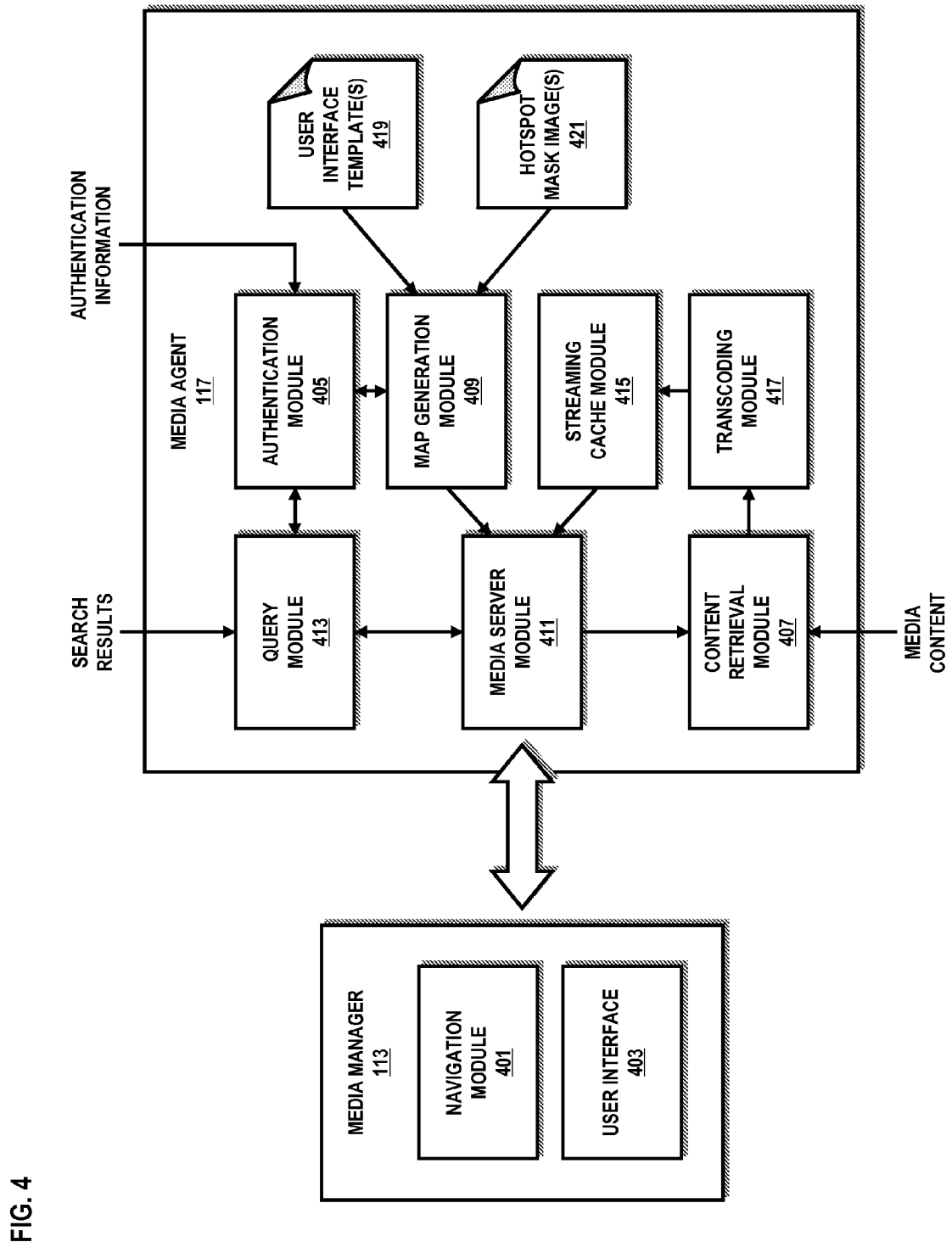
FIG. 4 is a diagram of a media manager and a media agent configured to facilitate content aggregation in support of virtual channels, according to an exemplary embodiment.

FIG. 4 is a diagram of a media manager and a media agent configured to facilitate content aggregation in support of virtual channels, according to an exemplary embodiment. As shown, media manager 113 includes navigation module 401 and user interface 403, whereas media agent 117 includes authentication module 405, content retrieval module 407, map generation module 409, media server module 411, query module 413, streaming cache module 415, and transcoding module 417. It is noted, however, that media manager 113 and/or media agent 117 may embody many other forms and include multiple and/or alternative components.

According to exemplary embodiments, navigation module 401 enables media manager 113 to communicate with media agent 117, such as for providing media manager 113 navigation maps for rendering user interface 403 and/or streaming media content retrieved over one or more data networks 103 from, for instance, third-party content provider system 105. In this manner, user interface 403 may embody one or more graphical user interfaces rendered based on computer program code from media manager 113, which is configured to present various menu options, interactive elements, and information about accessible media content available for presentation via content processing device 300. As a result, media agent 117 may be configured to communicate with media manager 113 over, for instance, a local area network associated with customer premise 127a, via media server module 411. In this way, navigation maps generated via, for instance, map generation module 409 may be transmitted to navigation module 401. As mentioned, navigation module 401 utilizes these navigation maps for rendering various aspects of (or corresponding to) user interface 403.

In exemplary embodiments, navigation maps may be generated based on one or more user interface templates 419 and/or one or more hotspot mask images 421. User interface templates 419 provide formatting for information presented via user interface 403, as well as for menu options, instructions, elements, etc. Hotspot mask images 421 are described in more detail below. It is noted that map generation module 409 may also utilize various content based aspects to generate navigation maps, such as audio, video, image, etc., content. Accordingly, certain navigation maps may be generated to include one or more addresses, identifiers, links, locators, etc. (hereinafter referred to collectively as links), of media content that may be streamed from, for instance, third-party content provider system 105 over one or more data networks 103 and, thereby, retrieved via content retrieval module 407. It is noted that the links may be received by query module 413 as part of one or more search results provided to media agent 117 by platform 200 and selected (or otherwise interacted with) by a user for presenting media content associated with the links via content processing device 300.

According to particular embodiments, map generation module 409 may be configured to generate a new navigational map, which is provided to navigation module 401 via media server module 411, each time a user navigates from one screen (or navigation shell) associated with user interface 403 to another screen. That is, for each distinct combination of navigation elements, e.g., menu items, arrow icons, radio buttons, etc., map generation module 409 may be configured to generate a distinctly new navigation map that may be provided to navigation module 401 via media server module 411 and, thereby, utilized by navigation module 401 to render aspects of user interface 403. It is noted, however, that map generation module 409 may, in certain instances, dynamically update an existing navigation map based on user interaction(s) associated with aspects of user interface 403. It is also contemplated that multiple links related to streaming media content may be included in a navigation map and, thereby, presented by, selected from, and/or otherwise interacted with via user interface 403.

Generally speaking, navigation maps may be configured to include information about media content (e.g., audio, video, images, etc.) available for presentation via content processing device 300. Navigation maps are also configured to provide user access to the media content, such as for searching for media content that is conventionally made available to individuals by one or more third-party content provider systems 105 over one or more data networks 103. In this manner, navigation maps may also be utilized, in association with corresponding subscriber accounts associated with these third-party content provider systems 105, to upload media content to (or remove media content from) third-party content provider systems 105, select and rate "favorite" media content made available by third-party content provider systems 105, and/or flag media content made available by third-party content provider systems 105 as, for instance, pornographic, violent, hateful, dangerous, copyright infringing, and/or spam-associated. In this manner, navigation module 401 may receive and/or retrieve navigation maps from media server module 411 in association with presenting user interface 403 and/or media content retrieved from one or more sources via one or more data networks 103.

According to certain exemplary embodiments, navigation maps may be generated by map generation module 409 in order to request and receive authentication information from, for example, one or more third-party content provider systems 105. This authentication information may be utilized in association with one or more other navigation maps that are configured to facilitate retrieving media content from third-party content provider systems 105 for presentation via content processing device 300, uploading media content to (or removing media content from) third-party content provider systems 105, selecting and rating "favorite" media content made available by third-party content provider systems 105, and/or flagging media content made available by third-party content provider systems 105. Exemplary processes for requesting and receiving authentication information are described in more detail with FIGS. 7A and 7B.

It is noted that navigation within user interface 403, e.g., user selections, interactions, menu configurations, access to one or more of the above features, etc., may be performed via hotspots of user interface 403. Hotspots are portions of generated user interfaces, such as user interface 403, that, when interacted with, link to (or cause) a new and/or updated presentations to be provided or enable particular functionality within a "current" user interface. According to various exemplary embodiments, hotspots are indicated in navigation maps based on hotspot mask images 421, which may be overlaid on user interface templates 419 so that interactive portions of user interface templates 419 are "masked" or otherwise covered by hotspot mask image(s) 421. It is noted that those portions of user interface templates 419 that are masked typically relate to navigational elements of user interface 403, such as menu options, icons, scrollbars, pull downs, radio buttons, and the like. In this manner, portions of hotspot mask images 421 may be selectively overlaid on user interface templates 419 to provide users with information concerning navigation within user interface 403 that, when highlighted by a user, may be used to provide the user with input via, for instance control device 303. Exemplary user interfaces are described in more detail with FIGS. 5, 8, and 10.

As previously mentioned, navigation maps include sets of information used to format presentations of menu options, navigation elements, information, etc., within one or more displays associated with user interface 403. These sets of information may be assembled via map generation module 409 and, thereby, may include content assembled from user interface templates 419 and/or hotspot mask images 421. In certain instances, navigation maps may include tags, tabs, fields, and/or instructions indicating a specific portion or portions of hotspot mask images 421 to be presented via user interface 403. As such, navigation maps generally provide menu options, information, elements, etc., and corresponding locations in which such user interface aspects should be deployed as part of user interface 403. Navigation maps may further identify media content to be included in user interface 403 and various information, e.g., navigation history information, uniform resource locator (URL) information, etc., for accessing and locating media content over one or more data networks 103 for presentation via content processing device 300. Additionally, navigation maps may include information concerning specific user interactions with keys of control device 303 and, thereby, corresponding actions to be implemented when such interactions are performed.

Figure 5:
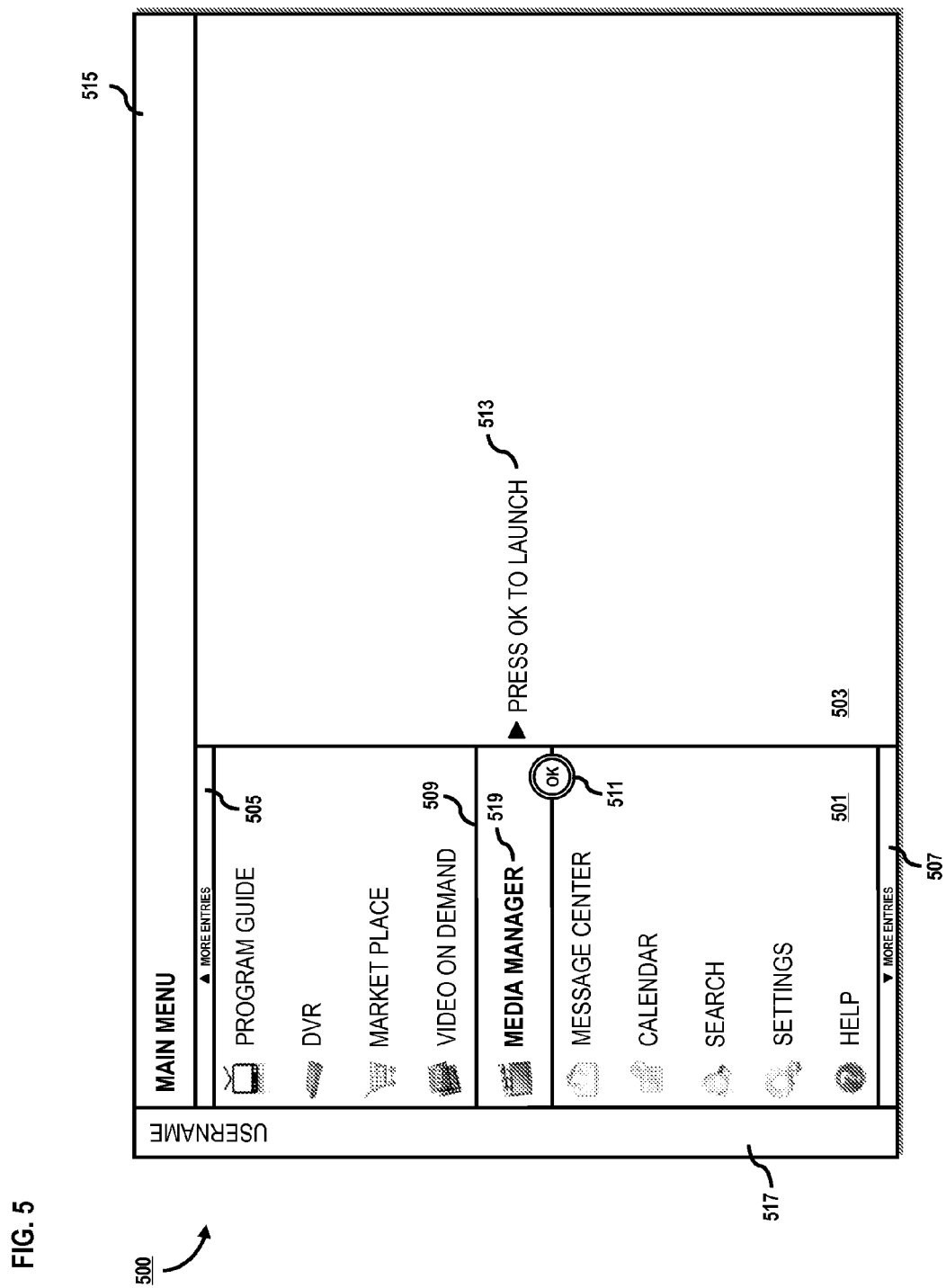
FIG. 5 is a diagram of a main menu user interface configured to facilitate content aggregation in support of virtual channels, according to an exemplary embodiment.

As there may be a relatively large number of media content sources and even more media content instances available to subscribers over data network(s) 103, content processing device 300 may include a user interface configured to allow users to seamlessly access the functions of content processing device 300, the available media content of one or more third-party content provider systems 105, and one or more media applications, such as media manager 113 and media agent 117. It is recognized, however, that the user interface may be implemented at one or more computing devices 119 or accessible via platform 200 or MSP 121. Thus, the user interface may be presented to the user as part of media manager 113 and/or media agent 117 accessed over a suitable communications link. Namely, web pages may be displayed to the user as part of online media manager 113 and/or media agent 117 applications accessed via data network(s) 103. FIG. 5 is a diagram of a main menu user interface configured to facilitate content aggregation in support of virtual channels, according to an exemplary embodiment.

User interface (or main menu) 500 may be evoked using a number of different methods. For example, a user may select a dedicated "MENU" button on control device 303 or a peripheral device communicatively coupled thereto, such as computing device 119, a mobile handset (not shown), and the like. It is recognized that any other suitable actuator of these devices may be additionally, or alternatively, used to access the functionality of main menu 500, such as triggering a "GUIDE" icon. Further, main menu 500 may be evoked by selecting an option within another interface or application, such as, for example, when navigating from a public screen (or navigational shell) to a user-specific screen, i.e., a private screen. As such, an executing device (e.g., content processing device 300, computing device 119, etc.) may require sufficient authentication information (e.g., username and password, etc.) to be input in order to access the functions of main menu 500. It is particularly noted that this authentication information may relate to authentication information associated a service provider of the virtual channel services of system 100.

As seen in FIG. 5, user interface 500, providing a "main menu," may include one or more interactive viewing panes, such as panes 501 and 503. In particular embodiments, as will be described in more detail below, the content of pane 503 may be dynamically updated to display various menu options, interaction elements, information, etc., related to user interaction within pane 501, and vice versa. In this example, however, pane 501 includes a listing of selectable entries corresponding to one or more features (or options) that may be provided via content processing device 300. For example, entries may include: program guide options, DVR options, marketplace (or shopping) options, on-demand programming options, media manager options, messaging and communications options, searching options, setting options, help options, and the like. In certain embodiments, graphical elements may be provided to correspond to one or more of these entries and, as a result, may be correspondingly displayed therewith.

One or more header 505 and footer 507 fields may be provided and configured to indicate the existence of additional entries not displayed, but navigably available. Accordingly, users may browse through the entries of user interface 500 via, for instance, control device 303 associated with content processing device 300. Further, user interface 500 may include one or more fixed focus states (such as border 509) and/or distinctive magnification features, e.g., color, brightness, bolding, font type, text size, etc., that may be used to convey a "currently" navigated position. In this manner, when a user navigates to a desired entry, actuation of, for instance, an "OK" button on control device 303 may launch (or evoke) corresponding features and/or applications associated with the particular entry. According to some embodiments, an interactive "OK" option 511 may be utilized. Moreover, main menu 500 may include one or more tooltips or other instructions, such as tooltip 513, when a user navigates to a particular entry. In other (or additional) embodiments, one or more aural descriptions of an entry "currently" navigated to and methods of interaction may be provided.

In certain other exemplary embodiments, main menu 500 may provide one or more navigation fields 515 and 517 to facilitate usability. For example, field 515 may provide the name of the function/option being accessed, e.g., "MAIN MENU." In this manner, when a user accesses a new function/option, field 515 may be automatically (or dynamically) updated, as is apparent in, for example, FIG. 8. Field 517 may be utilized to indicate a user profile "currently" authenticated to system 100, e.g., "USERNAME." Additional functionality associated with field 517 is described in conjunction with FIGS. 8 and 10. Thus, a user may access one or more features and/or functions associated with media manager 113 and/or media agent 117 by navigating to and selecting (or otherwise interacting with) entry 519 of main menu 500.

Figure 6:
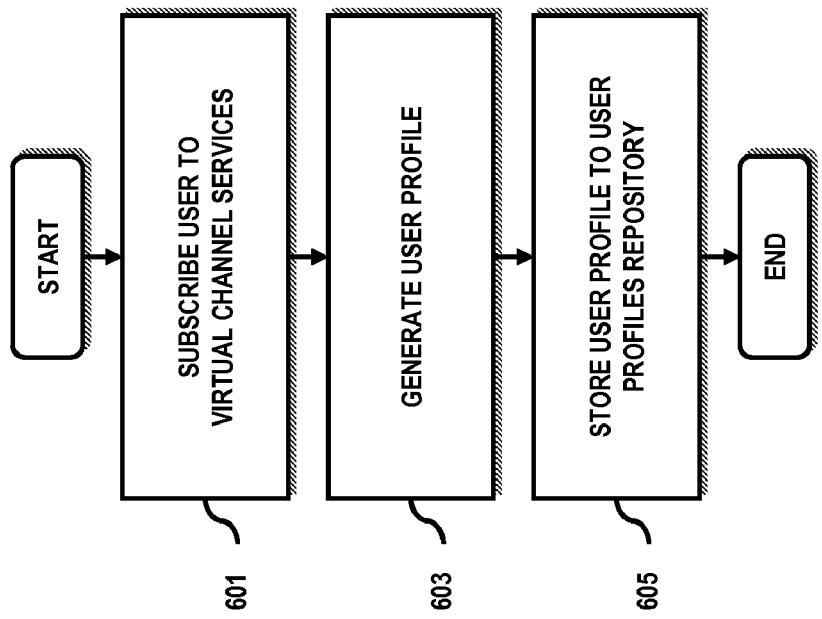
FIG. 6 is a flowchart of a process for subscribing a user to virtual channel services, according to an exemplary embodiment.

FIG. 6 is a flowchart of a process for subscribing a user to virtual channel services, according to an exemplary embodiment. For illustrative purposes, the process is described with respect to FIGS. 1-3. It is noted that the steps of the process may be performed in any suitable order, as well as combined or separated in any suitable manner. In step 601, platform 200 subscribes a user to the features and functions of system 100, such as one or more virtual channel services of system 100. According to one embodiment, the user may subscribe utilizing any suitable customer premise equipment (e.g., content processing device 107, computing device 119, etc.) capable of processing and transmitting information over one or more of networks 103, 111, and/or 125. For instance, the user may interact with an input interface (e.g., control device 303) of, for example, content processing device 300 to activate software resident on (or accessible to) the device. The software may establish communications with platform 200. As such, the user may be permitted to register as a new subscriber to the virtual channel services of system 100 and, thereby, may obtain sufficient authentication information for accessing one or more of these services. In certain embodiments, registration procedures may prompt the user to identify those user devices (e.g., content processing device 107, computing device 119, etc.) that the user may employ to interact with these services. As such, the software may automatically search for peripheral devices, e.g., through a pinging or other suitable procedure. In other (or additional) embodiments, the user may identify user devices by entering appropriate user device information, such as device type, serial number, registration number, machine access control address, directory address, communications link, etc. Further, when new user devices are employed, the software may be configured to add the apparatus to a running list of user devices associated with an account corresponding to the user. Accordingly, registered user devices may be logically associated with the user, i.e., the account.

Once registered (or as part of the registration process), platform 200 (or MSP 121) may enable the user, per step 603, to generate (or otherwise customize) a user profile including various user profile information, such as, for example, username and password information, other service provider associated account information, billing information, configuration information, and the like, as well as one or more other parameters, values, variables, numbers, keys, etc., previously described and/or other like user profile information, such as personal user profile information, e.g., user demographics, group/organizational affiliations, memberships, interests, etc. It is also noted that this user profile information may include addressing (or otherwise uniquely identifying) information associated with specified user devices, such as, for example, one or more directory addresses, electronic serial numbers, international mobile equipment identifiers, machine access control addresses, mobile directory numbers, mobile equipment identities, mobile identification numbers, internet protocol addresses, port addresses, and/or any other suitable address (or identifier). As such, the user profile may include one or more user-defined attributes and/or policies for carrying out functions of system 100. In particular instances, when the user authenticates a presence with system 100 via, for instance, content processing device 107 and/or computing device 119, the software may provide user-specific interfaces and/or features based on information stored within the user profile. Moreover, authentication procedures at one device (e.g., content processing device 107) may authenticate other devices (e.g., computing device 119), or vice versa. Accordingly, at step 605, platform 200 stores the user to a list of subscribers to the virtual channel services of system 100, as well as stores the generated user profile, authentication information, user device addressing information, etc., to, for example, user profiles repository 131. It is noted, however, that platform 200 may additionally (or alternatively) store or synchronize this user profile information to any other suitable storage location and/or memory of (or accessible to) platform 200.

Figure 7A:
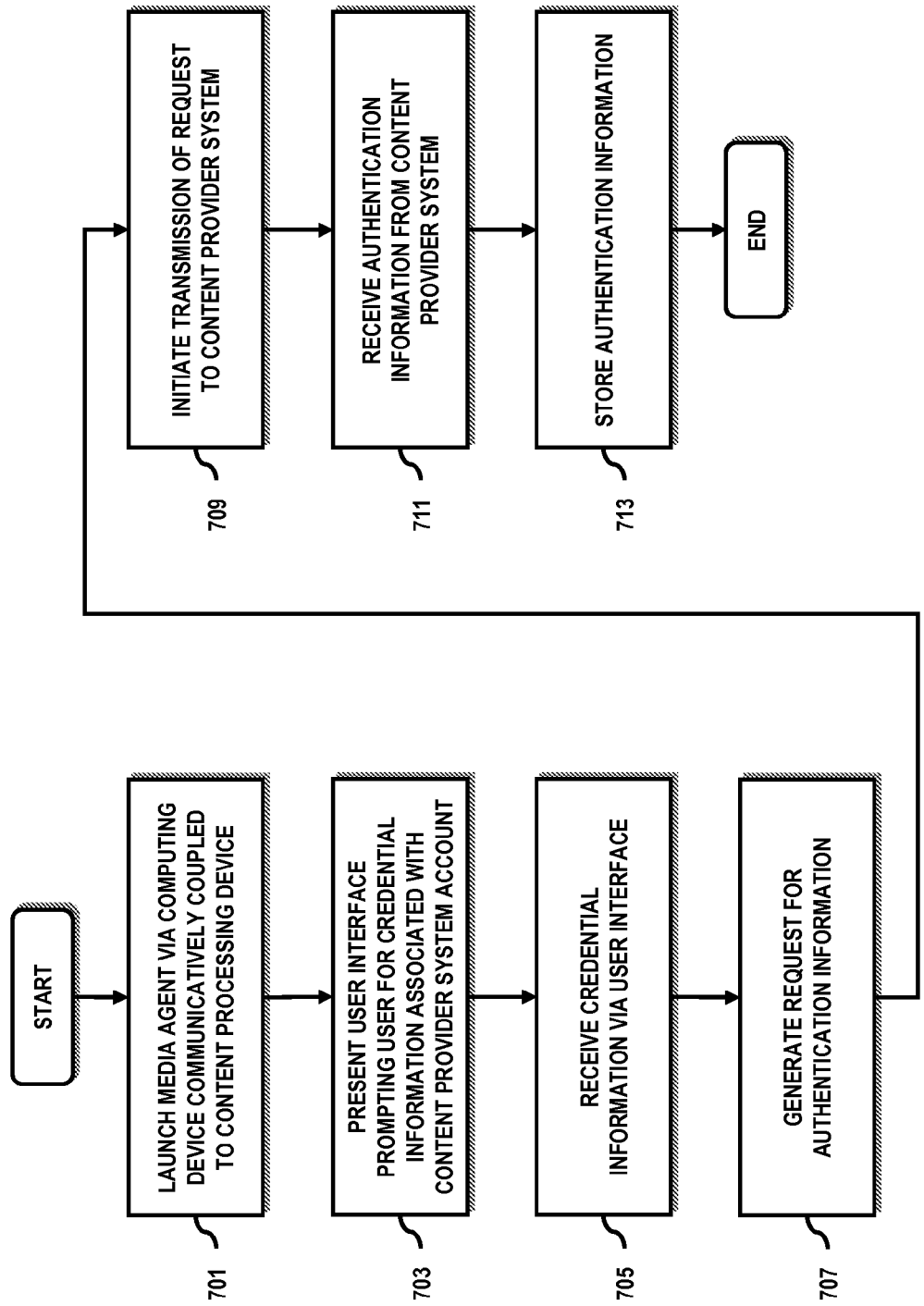
FIGS. 7A and 7B are flowcharts of processes for requesting and receiving authentication information to facilitate content aggregation in support of virtual channels, according to exemplary embodiments.
Figure 7B:
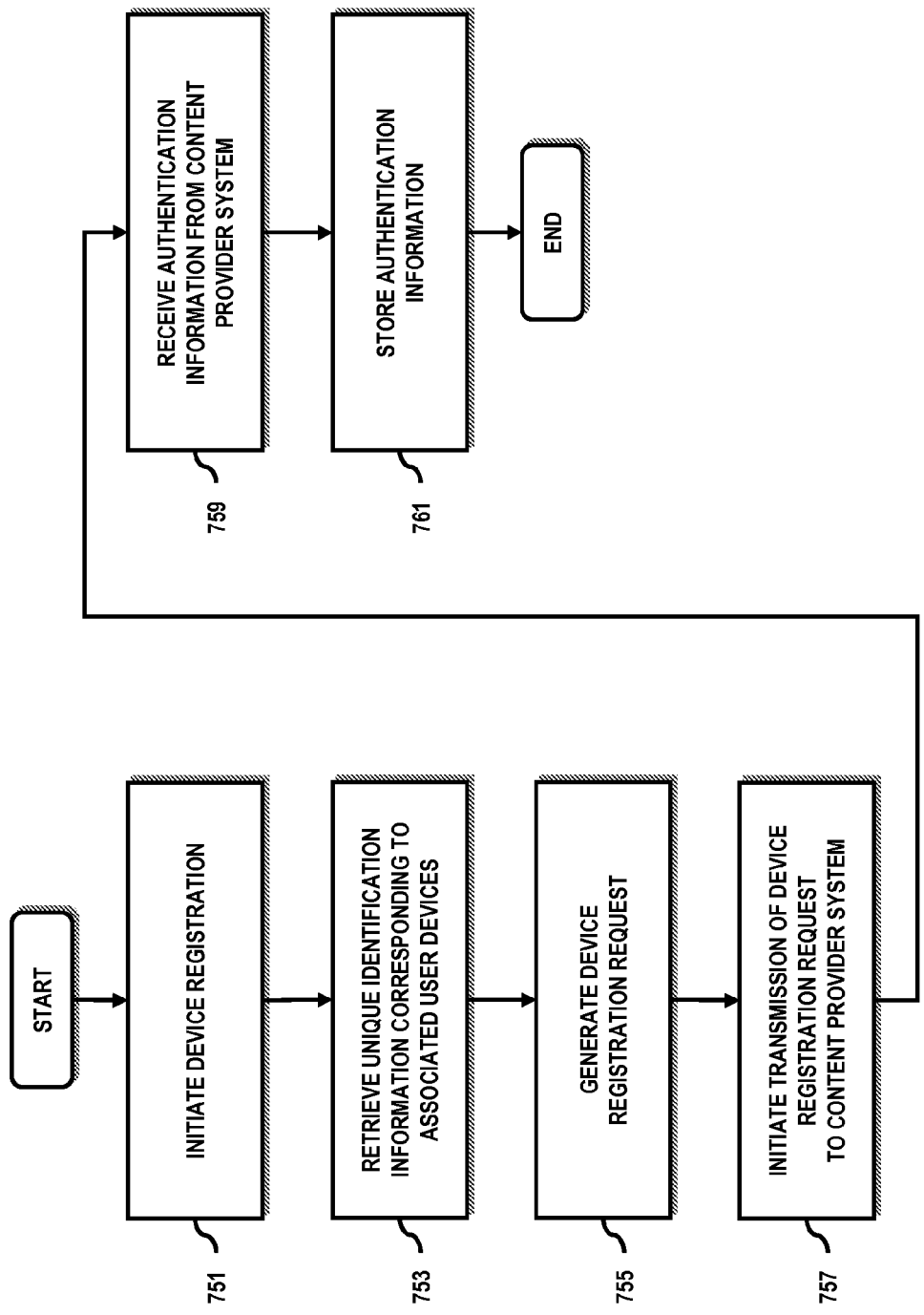

FIGS. 7A and 7B are flowcharts of processes for requesting and receiving authentication information to facilitate content aggregation in support of virtual channels, according to exemplary embodiments. For the purpose of illustration, the processes are described with respect to FIGS. 1 and 4, as well as exemplary user interface 800 of FIG. 8 that may be employed to facilitate the process of FIGS. 7A and 7B. The processes also assume that a user is interacting with media agent 117 that may be executed via, for example, computing device 119 or any other suitable user device. Further, it is noted that the steps of the processes may be performed in any suitable order, as well as combined or separated in any suitable manner.

In particular, FIG. 7A is a flowchart of a process for requesting and receiving authentication information relating to an authentication token and a username, according to an exemplary embodiment. At step 701, computing device 119 launches media agent 117 based on, for instance, computer program code stored to a memory of (or associated with) computing device 119. In exemplary embodiments, computing device 119 is communicatively coupled to content processing device 107, such as via a local area network (LAN) hosted at user premise 127a via, for instance, router 129. In this manner, the computer program code may be configured, with at least one processor of computing device 119, to cause computing device 119 to at least present, per step 703, one or more user interfaces prompting a user for credential information (e.g., username and password, etc.) associated with at least one third-party content provider system subscriber account. Thus, in step 705, computing device 119 may receive the credential information via the one or more user interfaces, i.e., via user input to the one or more user interfaces. An exemplary user interface configured to request and receive credential information associated with one or more third-party content provider system subscriber accounts is described in more detail in association with FIG. 8.

Figure 8:
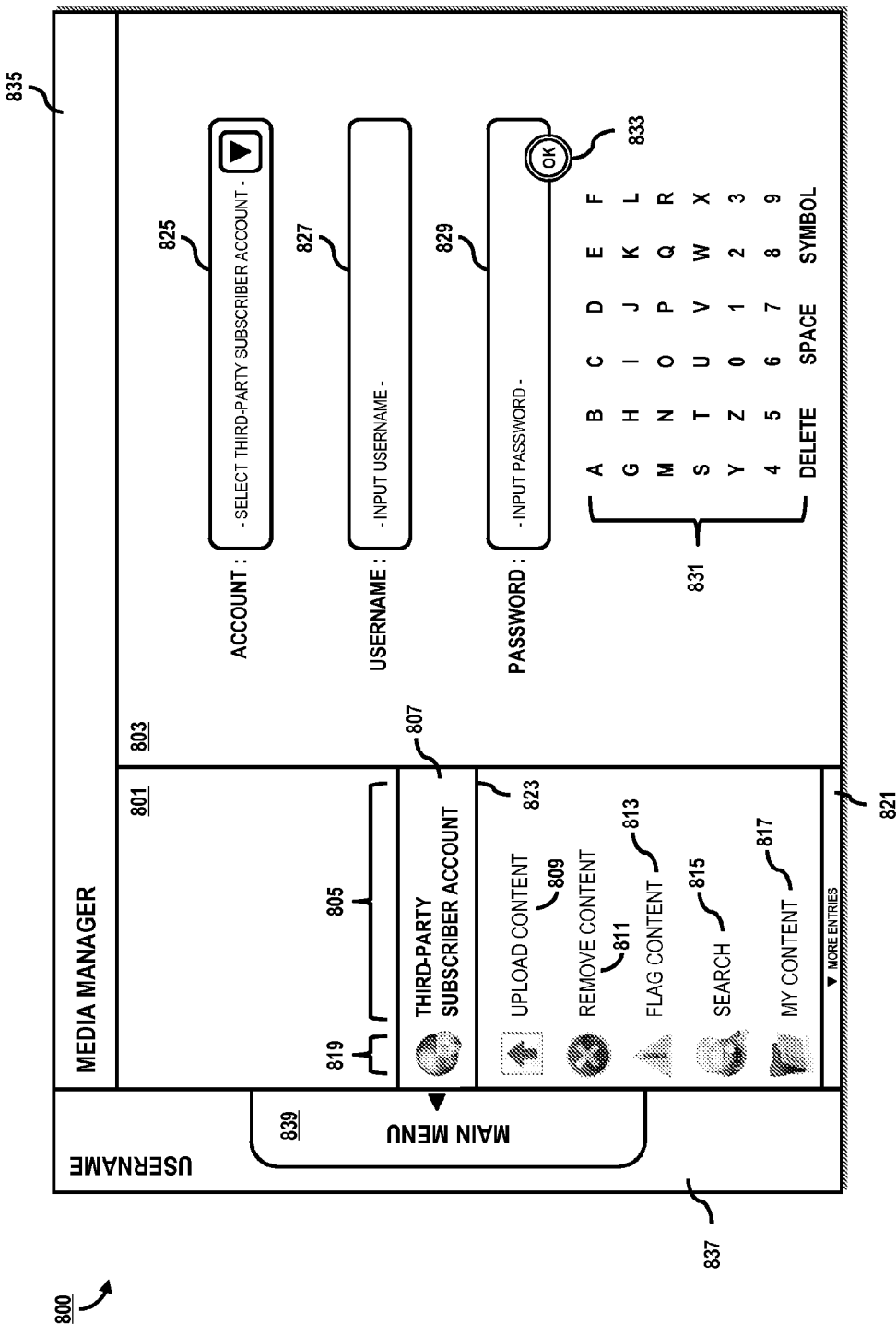
FIG. 8 is a diagram of a user interface utilized in the process of FIG. 7, according to an exemplary embodiment.

As seen in FIG. 8, a user may employ user interface 800 to provide credential information corresponding to one or more third-party subscriber accounts that are respectively associated with, for instance, one or more third-party content provider systems 105. More specifically, user interface 800 may comprise screens (or panes) corresponding to navigation shells of a media application associated with content processing device 107, such as media manager 113 or media agent 117. As previously described with respect to main menu 500, user interface 800 may include one or more interactive viewing panes 801 and 803 having displays that may be dynamically altered in response to user interaction within one or more of panes 801 and 803. Pane 801 may include a list 805 of navigably selectable entries providing various features associated with media manager 113 and/or media agent 117, such as a third-party subscriber account feature 807, upload content feature 809, remove content feature 811, flag content feature 813, search feature 815, and my content feature 817. In certain embodiments, a plurality of graphical elements 819 may be provided to correspond to one or more of the entries of list 805 and, as such, may be correspondingly displayed therewith.

Footer field 821 may be provided to indicate the existence of additional entries not presented, but navigably available. For instance, user interface 800 may provide users with one or more additional, not illustrated features, such as a rate media content feature and a favorite media content feature. In this manner, users may browse through entries 807-817 and/or the one or more not illustrated features via, for instance, a key pad of (or associated with) control device 303. As seen in FIG. 8, a fixed focus state, such as border 823, and/or one or more distinctive magnification features may be utilized to convey a "currently" navigated position, i.e., a position associated with entry 807. Thus, when a user navigates to a desired entry, the presentation of pane 803 may toggle between corresponding menu options, interactive elements, information, and the like, for interfacing with the various features of the media application. For instance, when a user navigates to entry 807, pane 803 may be dynamically provisioned to enable users to specify credential information corresponding to one or more third-party subscriber accounts associated with, for instance, one or more respective third-party content provider systems 105. In this manner, user interface 800 may be configured to facilitate requesting and receiving authentication information from the one or more third-party content provider systems 105.

According to exemplary embodiments, users may select (via, for example, the key pad of control device 303) from one or more third-party subscriber accounts that may be interfaced with via, for instance, pull down menu 825. In this manner, users may enter (or otherwise input) associated credential information (e.g., username and password information) to username box 827 and password box 829 via, for instance, the key pad of control device 303 or an "on-screen" keyboard, such as keyboard 831. As such, interaction with "OK" option 833 (or corresponding button of control device 303) may be configured to cause the media application to initiate generation of an authentication request for transmission to a corresponding third-party content provider system 105 identified via pull down menu 825. In the exemplary process of FIG. 7A, interaction with, for example, "OK" option 833 may be configured to cause media agent 117 to generate an authentication request based on the credential information input to boxes 827 and 829. As will become more apparent below, e.g., with the description accompanying FIG. 7B, interaction with "OK" option 833 (or corresponding button of control device 303) may be configured to also cause the media application to retrieve certain user device information for registering associated user devices with third-party content provider system 105 and, thereby, receive additional authentication information.

It is also noted that, user interface 800 may include one or more navigation fields, such as navigational fields 835 and 837, to facilitate usability. In the depicted embodiment, field 835 provides the name of the function/option being accessed, e.g., "MEDIA MANAGER," whereas field 837 includes tab 839 indicating a browsing (or navigation) path or thread created by the user during a particular session. Tab 839 may be labeled and configured to be selectable so that a user can easily return to a particular feature/option within a navigation history without having to restart a session. In alternative embodiments, users may navigate session histories via "BACK" and "FORWARD" buttons of control device 303. Further, field 837 may indicate a user profile of the "current" session, e.g., "USERNAME."

Referring back to FIG. 7A, authentication module 405 may be configured, at step 707, to generate at least one request for authentication information from, for example, third-party content provider system 105 using the credential information. The at least one request for authentication information may be generated to comply with one or more interfacing protocols associated with API(s) 109 of third-party content provider system 105. For instance, the authentication request may be generated as a hypertext transfer protocol (HTTP) POST request to a particular authentication API that may be identified by one or more URLs, URNs, CURIEs, XRIs, IRIs, etc., associated with third-party content provider system 105. As such, the HTTP POST request may be generated to include a header portion and a body portion. The header portion may be configured to at least include (or otherwise specify) one or more predefined content-type values, such as "application/x-www-form-urlencoded," whereas the body portion may be configured to include the username in a first body region and the password in a second body region. A third body region may include (or otherwise specify) an identifier of the media application generating the HTTP POST request, which may be utilized by service administrators for debugging and logging purposes.

Once the request for authentication information is generated, authentication module 405 may be configured, in step 709, to initiate transmission of the generated authentication request to third-party content provider system 105. For example, the authentication request may be initiated for transmission to the authentication API identified by the one or more URLs, URNs, CURIEs, XRIs, IRIs, etc. At step 711, computing device 119 may be configured to receive authentication information from third-party content provider system 105 in response to the authentication request. This authentication information may relate to an authentication token and a username name associated with the user and third-party content provide system 105. In certain embodiments, the authentication information may be received as one or more HTTP POST request responses. It is also contemplated that the authentication request may specify computing device 119 and/or content processing device 107 as an intended receiver of the authentication information and, as such, the authentication information may be directly transmitted to computing device 119 and/or content processing device 107. In the exemplary process of FIG. 7A, however, computing device 119 receives the authentication information and, as such, may be configured to store the authentication information to, for instance, a memory of (or associated with) computing device 119, per step 713.

It is noted that the authentication information received by way of the exemplary process of FIG. 7A may be utilized in association with accessing one or more other features provided by way of APIs 109 of third-party content provider system 105, such as one or more search for media content features, media content streaming features, uploading media content features, removing media content features, media content rating features, and favorite media content features, as well as other like features. In certain instances, however, additional authentication information way be utilized in conjunction with the aforementioned features in order to, for example, access higher quality streaming media content, receive streaming media content in a range of formats (which may be application dependent), and enable streaming media content to be streamed to other user devices, such as one or more mobile user devices. It is noted that this additional authentication information made be acquired from, for instance, third-party content provider system 105 based on registering user devices logically associated with a user, such as those user devices specified in the process of FIG. 6, with third-party content provider system 105.

FIG. 7B is a flowchart of a process for requesting and receiving authentication information corresponding to one or more device identifiers and one or more respectively associated encrypted device keys, according to an exemplary embodiment. At step 751, a media application initiates device registration with third-party content provider system 105 via, for instance, authentication module 405. As previously mentioned, device registration may be initiated based on interaction with "OK" option 833 of FIG. 8 or a corresponding button of control device 303. It is noted, however, that any other suitable trigger may be utilized. In any event, authentication module 405 may, in step 753, retrieve unique identification information corresponding to one or more user devices logically associated with a user. This unique identification information may relate to the aforementioned addressing/indentifying information described in conjunction with FIG. 6. The unique identification information may be utilized, per step 755, to generate one or more device registration requests that, in exemplary embodiments, may be generated to comply with one or more interfacing protocols associated with API(s) 109 of third-party content provider system 105. For instance, the device registration request may be generated as a hypertext transfer protocol (HTTP) POST request to a particular device registration API that may be identified by one or more URLs, URNs, CURIEs, XRIs, IRIs, etc., associated with third-party content provider system 105. As such, the HTTP POST request may be generated to include a header portion and a body portion. The header portion may be configured to at least include (or otherwise specify) one or more predefined content-type values, such as "application/x-www-form-urlencoded," whereas the body portion may be configured to include the credential information input to boxes 827 and 829, as well as the unique device identification information. For instance, the body portion may include the username in a first body region and the password in a second body region. A third body region may include (or otherwise specify) an identifier of the media application generating the HTTP POST request, which may be utilized by service administrators for debugging and logging purposes. One or more additional regions may be provided for including (or otherwise specifying) the device information associated with respective user devices.

Once the request for device registration is generated, authentication module 405 may be configured, in step 757, to initiate transmission of the generated device registration request to third-party content provider system 105. For example, the authentication request may be initiated for transmission to the device registration API identified by the one or more URLs, URNs, CURIEs, XRIs, IRIs, etc. At step 759, computing device 119 may be configured to receive authentication information from third-party content provider system 105 in response to the device registration request. This authentication information may relate to device identifiers of the corresponding user devices and respectively associated encrypted device keys. In certain embodiments, the authentication information may be received as one or more HTTP POST request responses. It is also contemplated that the authentication request may specify computing device 119 and/or content processing device 107 as an intended receiver of the authentication information and, as such, the authentication information results may be directly transmitted to computing device 119 and/or content processing device 107. In the exemplary process of FIG. 7B, however, computing device 119 receives the authentication information and, as such, may be configured to store the authentication information to, for instance, a memory of (or associated with) computing device 119, per step 761.

In this manner, the authentication information received by way of the exemplary processes of FIGS. 7A and 7B may be included within respective header portions of various feature requests transmitted to various APIs 109 associated with third party content provider system 105 to enable users to access these features, such as search for media content features, media content streaming features, uploading media content features, removing media content features, media content rating features, favorite media content features, etc.

Figure 9:
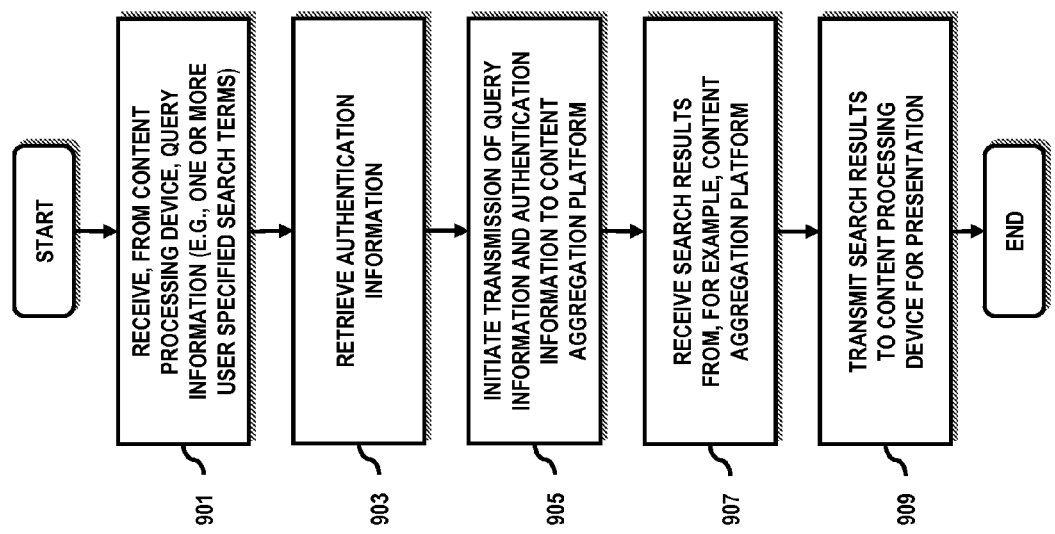
FIG. 9 is a flowchart of a process for receiving search results for content, according to an exemplary embodiment.

According to particular exemplary embodiments, one or more media applications, such as media manager 113 and/or media agent 117, may be utilized to specify and search for media content accessible over a data network, such as media content associated with third party content provider system 105. FIG. 9 is a flowchart of a process for receiving search results for content, according to an exemplary embodiment. For the purpose of illustration, the process is described with respect to FIGS. 1-4, as well as exemplary user interface 1000 of FIG. 10 that may be employed to facilitate the process of FIG. 9. The process assumes that a user is interacting with one or more user interfaces associated with media manager 113 for the purposes of searching for media content made available by third-party content provider system 105 and, thereby, accessible over one or more data networks 103. In this manner, media manager 113 may utilize media agent 119 to interface with platform 200 for requesting and receiving search results for the media content. It is contemplated, however, that the user may directly employ one or more user interfaces associated with media agent 117 for requesting and receiving the search results. Further, the steps of the process may be performed in any suitable order, as well as combined or separated in any suitable manner.

In step 901, media agent 117 receives, from content processing device 107 (e.g., media manager 113), query information, such as one or more user-specified search terms. That is, a user may interact with, for instance, content processing device 300 via control device 303, to evoke media manager 113. In one embodiment, media manager 113 may be launched from main menu 500, such as by selecting (or otherwise interacting with) entry 519. As such, the user may navigate to and, thereby, evoke search feature 815 for inputting one or more search terms for requesting search results relating to media content made available by third-party content provider system 105.

Figure 10:
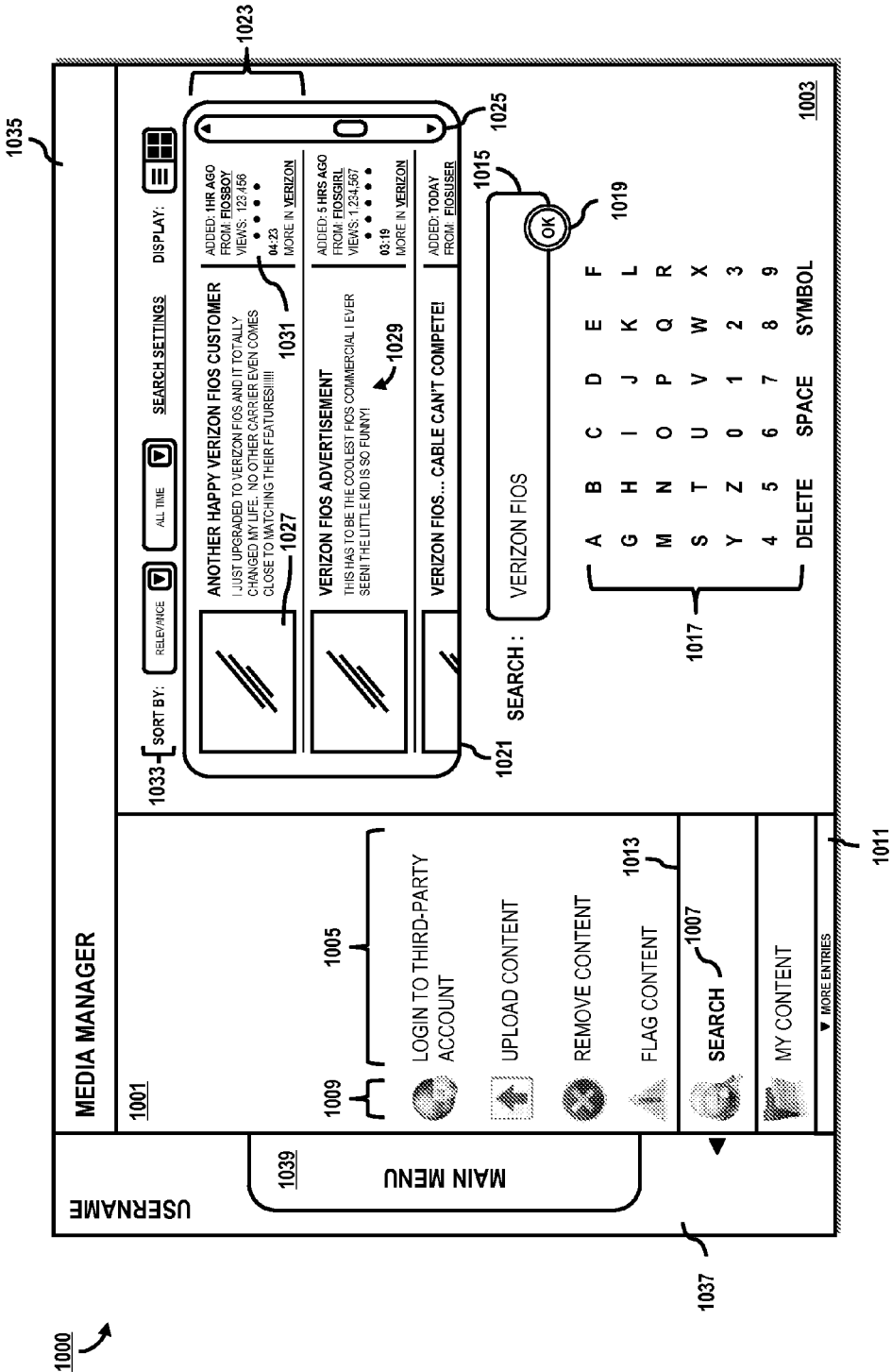
FIG. 10 is a diagram of a user interface utilized in the process of FIG. 9, according to an exemplary embodiment.

As seen in FIG. 10, a user may employ user interface 1000 to input one or more search terms for requesting search results relating to media content made available by third-party content provider system 105. More specifically, user interface 1000 may comprise screens (or panes) corresponding to navigation shells of a media application associated with content processing device 107, such as media manager 113 or media agent 117. As previously described with respect to main menu 500 and user interface 800, user interface 1000 may include one or more interactive viewing panes 1001 and 1003 having displays that may be dynamically altered in response to user interaction within one or more of panes 1001 and 1003. Pane 1001 may include a list 1005 of navigably selectable entries providing various features associated with media manager 113 and/or media agent 117, such as search feature 1007 enabling users to request and receive search results relating to media content made available by third-party content provider system 105 over one or more data networks 103. In certain embodiments, a plurality of graphical elements 1009 may be provided to correspond to one or more of the entries of list 1005 and, as such, may be correspondingly displayed therewith.

Footer field 1011 may be provided to indicate the existence of additional entries not presented, but navigably available. Users may browse through these entries via, for instance, control device 303. As seen in FIG. 10, fixed focus state, such as border 1013, and/or one or more distinctive magnification features may be utilized to convey a "currently" navigated position, i.e., a position associated with search entry 1007. In this manner, when a user navigates to a desired entry, the presentation of pane 1003 may toggle between corresponding menu options, interactive elements, information, and the like, for interfacing with the various features of the media application. For instance, when a user navigates to entry 1007, one or more search terms may be specified for requesting and receiving one or more search results relating to media content made available by third-party content provider system 105, e.g., as seen in pane 1003.

According to exemplary embodiments, users may input suitable search term(s) to query box 1015 via, for instance, a key pad of control device 303 or an "on-screen" keyboard, such as keyboard 1017. In particular embodiments, various search terms may be combined or strung together by logical operators/connectors, e.g., and, or, not, etc., commands. As such, user interface 1000 may be configured to permit complex (or Boolean) searches. It is noted that the input to query box 1015 may be considered query information. In this manner, interaction with "OK" option 1019 (or corresponding button of control device 303, etc.) may be configured to cause the media application to initiate a query request for media content related to the query information of query box 1015. In the exemplary process of FIG. 7, interaction with, for example, "OK" option 1019 may be configured to cause media manager 113 to transmit the query information input to query box 1015 to media agent 117 for transmission to platform 200 and, thereby, for requesting and receiving one or more search results relating to the query information.

Referring back to FIG. 9, at step 903, media agent 117 retrieves authentication information from, for instance, a memory (not shown) associated with computing device 119. It is noted, however, that media agent 117 may retrieve the authentication information from any suitable storage location and/or memory accessible to computing device 119, such as memory 325 of content processing device 300, etc. The authentication information may relate to the authentication information received and stored in association with the process of FIG. 7, e.g., an authorization token and a username or at least one device identifier and at least one encrypted device key. Accordingly, media agent 117 via, for instance, query module 413, may be configured to, per step 905, initiate transmission of the query information and authentication information to platform 200. In exemplary embodiments, transmission of this information may be facilitated via one or more hypertext transfer protocol secure communications between media agent 117 and platform 200. At step 907, media agent 117 may be configured (via, for example, query module 413) to receive one or more search results from, for example, platform 200. It is contemplated, however, that the one or more search results may be received via content processing device 107 and/or may be directly transmitted from third-party content provider system 105 to media agent 117 or content processing device 107. It is noted that an exemplary process for requesting and receiving search results from third-party content provider system 105 is described in more detail with FIG. 11. In the example of FIG. 9, however, media agent 117 may be configured (via, for example, media server module 411) to transmit, per step 909, the one or more received search results to media manager 113 for presentation via content processing device 107, e.g., for presentation via display 309 and/or audio system 321.

Averting to FIG. 10, user interface 1000 may also be employed to present one or more search results acquired from third-party content provider system 105. In this manner, pane 1003 may further include windowed region (or region) 1021 for presentation of received search results, such as search result 1023. In certain instances, one or more navigation elements, e.g., scrollbar 1025, page traversal buttons (not shown), tabs (not illustrated), etc., may be provided to indicate the existence of additional search results not displayed, but navigably available. Users may be permitted to interact with, for instance, scrollbar 1025 (via, for example, one or more directional buttons of control device 303) to navigate through the various search results of region 1021.

According to exemplary embodiments, respective search results of region 1021, such as search result 1023, may include various result regions or elements, such as result element 1027 and informational regions 1029 and 1031. Result element (or element) 1027 may be configured to present an image corresponding to media content associated with the particular result. In certain instances, the image may relate to a "thumbnail image" of a video corresponding to the particular result, which may have been generated based on a frame of the video. Alternatively, result element 1027 may be a dynamic preview region, such that "cursory" user interaction with the dynamic preview region, such as scrolling a cursor over the dynamic preview region, may cause a predetermined length of the video to be streamed and, thereby, presented to the user. In exemplary embodiments, result element 1027 may be respectively correlated with addressing information and/or other identifying information specifying a "location" where the media content associated with the particular search result may be retrieved and/or streamed from, such as a uniform resource locator (URL), a uniform resource name (URN), a compact uniform resource identifier (CURIE), an extensible resource identifier (XRI), an internationalized resource identifier (IRI), or other suitable address/identifier, such as a namespace identifier. In alternative embodiments, identifiers may include path variables, IP addresses, MAC addresses, directory addresses, serial numbers, registration numbers, buddy names, etc., as well as combinations thereof. As such, more "complete" user interaction with result element 1027 may be configured to establish a link (e.g., virtual channel) between media agent 117 (e.g., content retrieve module 407) and, for instance, third-party content provider system 105 over data network(s) 103 for downloading, transcoding, and/or streaming the media content associated with the particular search result to content processing device 107 (e.g., presentation module 327) for presentation to the user via, for example, display 309 and/or audio system 321. Alternatively, the link may be multifaceted or staged, e.g., a first link (or stage) may be established between third-party content provider system 105 and platform 200 (or MSP 121) and a second link (or stage) may be established between platform 200 (or MSP 121) and content retrieval module 407. It is also contemplated that direct links may be established between third-party content provider system 105 and content processing device 107. Further, one or more of these links may be stored in associated with a "MY CONTENT" and/or "FAVORITE" feature as a suitable identifier (or identifying information) for later selection and, thereby, presentation via, for instance, content processing device 300.

It is contemplated that one or more fixed focus states and/or one or more distinctive magnification features may be utilized to convey a "currently" navigated position of window 1021, such as a position associated with a particular search result. In this manner, navigating to a particular position may be configured to effectuate the previously mentioned "cursory" user interaction, whereas selecting an "OK" option (not shown) or an "OK" button (not illustrated) of control device 303 may be configured to effectuate the previously mentioned more "complete" user interaction. As will become more apparent below, selection of a particular search result (e.g., selection of search element 1027) may be configured to cause media content associated with the particular search result to be presented to a user via content processing device 300. It is noted that an exemplary process for presenting media content related to a particular search result is described in more detail with FIG. 12.

According to various exemplary embodiments, information region 1029 may be configured to provide a title and/or description of media content associated with a particular search result. Information region 1031 may be configured to provide temporal publishing information (e.g., a timestamp corresponding to when the media content was uploaded to third-party content provider system 105), party information (e.g., username or other identifier relating to a party who uploaded the media content to third-party content provider system 105), viewing information (e.g., a number relating to how many times the media content was viewed by one or more individuals), rating information (e.g., a number of "stars" corresponding to how "good" or "valuable" the media content is for its intended purpose), attribute information (e.g., length, size, quality, etc., of the media content), and related category information (e.g., a classification pigeonholing the media content as being related to one or more characteristics), as well as any other suitable information. In certain embodiments, the party information and/or category information may be selectable, such that user interaction with the party information or the category information may cause media agent 117 to generate new query information and, thereby, cause window region 1021 to dynamically present new search results related to the party information or category information.

User interface 1000 may also include one or more search options 1033 for sorting retrieved search results, refining the query information to narrow search results presented via window 1021, and affect the presentation style (e.g., listing style, thumbnail style, etc.) of search results presented via window 1021. As with main menu 500, and user interface 800, navigation fields 1035 and 1037 may be provided to facilitate usability. In the depicted embodiment, field 1035 provides the name of the function/option being accessed, e.g., "MEDIA MANAGER," whereas field 1037 includes tab 1039 indicating a browsing (or navigation) path or thread created by the user during a particular session. Tab 1039 may be labeled and configured to be selectable so that a user can easily return to a particular feature/option within a navigation history without having to restart a session. In alternative embodiments, users may navigate session histories via "BACK" and "FORWARD" buttons of control device 303. Further, field 1037 may indicate a user profile of the "current" session, e.g., "USERNAME."

Figure 11:
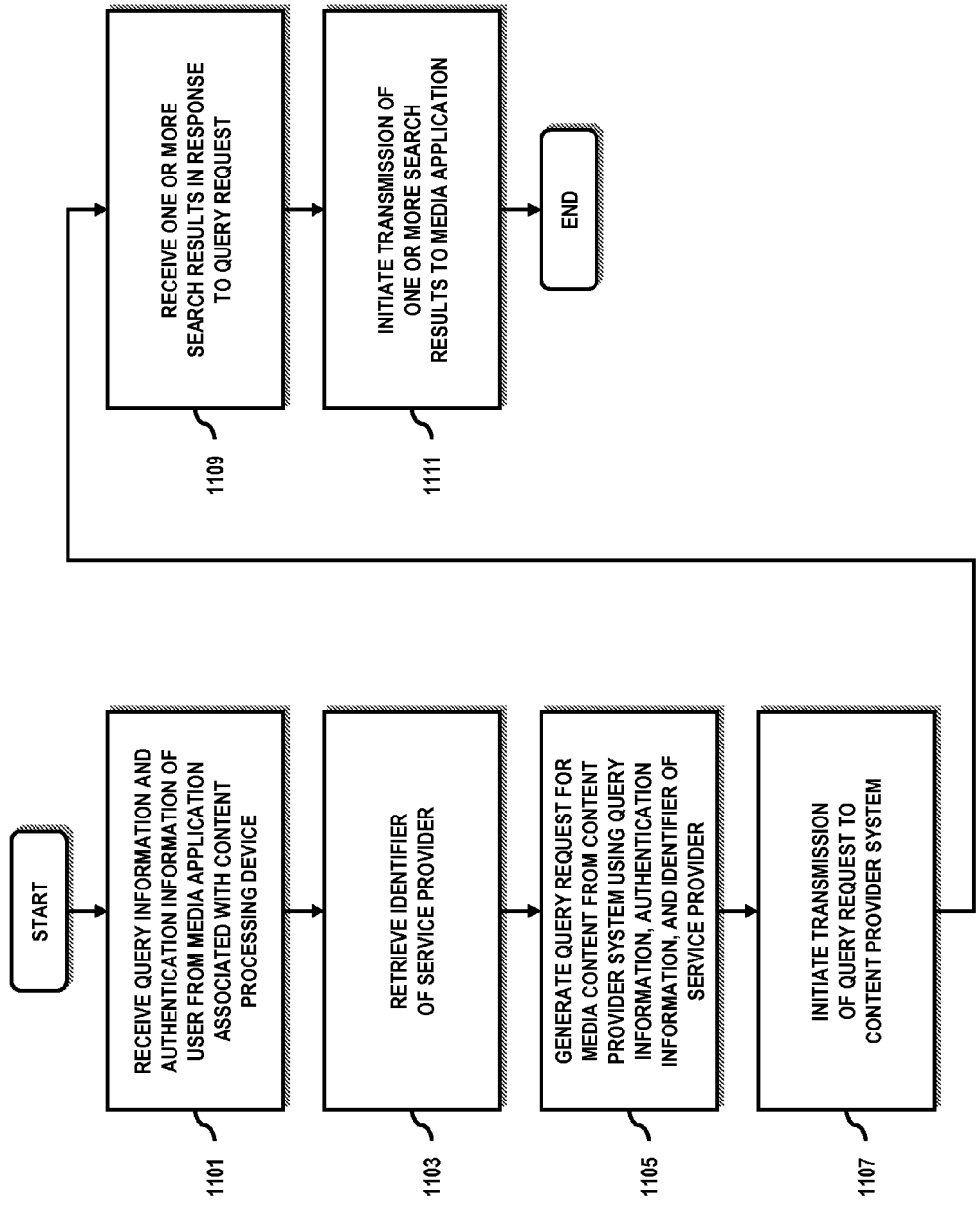
FIG. 11 is a flowchart of a process for retrieving and initiating transmission of one or more search results for content, according to an exemplary embodiment.

FIG. 11 is a flowchart of a process for retrieving and initiating transmission of one or more search results for content, according to an exemplary embodiment. For the purpose of illustration, the process is described with respect to FIGS. 1-4. The process assumes that a user is interacting with one or more user interfaces associated with a media application to search for media content made available by third-party content provider system 105 and, thereby, accessible over one or more data networks 103. In this manner, the media application may comprise (or interface with) media agent 119 to correspondingly communication with platform 200 for obtaining search results for the media content. It is also noted that the steps of the process may be performed in any suitable order, as well as combined or separated in any suitable manner.

At step 1101, platform 200 receives via, for instance, communication interface 201, query information and authentication information of a user from a media application associated with content processing device 300. For instance, platform 200 may receive the query information and authentication information from media agent 117 on behalf of media manager 113; however, media manager 113 may be configured to directly provide this information to platform 200. It is noted that the authentication information may relate to one or more of an authentication token issued by, for instance, third-party content provider system 105 (such as in accordance with the process of FIG. 7), a username corresponding to a third-party subscriber account of the user that is associated with third-party content provider system 105, one or more device identifiers respectively associated with content processing device 107 and/or computing device 119, and one or more encrypted device keys issued by third-party content provider system 105 (such as in accordance with the process of FIG. 7) that respectively relate to the one or more device identifiers. The query information may relate to one or more search terms input to, for example, query box 1015 of FIG. 10.

According to exemplary embodiments, the query information and the authentication information may be ported (or otherwise provided) to query request module 209 by communication interface 201 so that query request module 209 may generate at least one query request for retrieving search results from, for instance, third-party content provider system 105 relating to media content made available by third-party content provider system 105. In step 1103, platform 200 (e.g., query request module 209) may retrieve an identifier of the service provider of the virtual channel services of system 100 from, for instance, memory 207 or any other suitable storage location and/or memory of (or accessible to) platform 200. It is noted that this "service provider" identifier may have been previously applied for and received from third-party content provider system 105 to uniquely identify the service provider, such as for logging and debugging purposes. It is noted that query request module 209 may be configured, in certain embodiments, to initiate retrieval of the service provider identifier based on receiving the query information and authentication information; however, any other trigger may be utilized to initiate the retrieval.

In exemplary embodiments, query request module 209 is configured, per step 1105, to generate at least one query request for media content from, for example, third-party content provider system 105 using the query information, the authentication information, and the retrieved service provider identifier. The at least one query may be generated to comply with one or more interfacing protocols associated with API(s) 109 of third-party content provider system 105. According to one embodiment, the query request may be generated to include a header portion and a body portion. In this manner, the header portion may be configured to include (or otherwise specify) the authentication information in a first header region and the service provider identifier in a second header region, whereas the body portion may be configured to include (or otherwise specify) the query information. As such, the query request may be further generated as one or more hypertext transfer protocol (HTTP) GET requests to a particular search API that may be identified by one or more URLs, URNs, CURIEs, XRIs, IRIs, etc., associated with third-party content provider system 105. The query request may also include other parameters within corresponding regions of the body portion, such as formatting parameters (e.g., specifying a "feed" to be returned by the search API, requesting search results to be formatted based on certain protocols, etc.), author parameters (e.g., restricting searches from returning media content associated with one or more impermissible authors), callback parameters (e.g., utilized for returning search results to platform 200), result parameters (e.g., specifying a maximum number of permissible search results), indexing parameters (e.g., specifying an index of a first matching search result that should be included as part of a set of one or more search results), reject parameters (e.g., governing rejection of invalid query information), version parameters (e.g., specifying version information of the search API being queried), caption parameters (e.g., restricting searches from returning media content with or without caption information), category parameters (e.g., narrowing a field of search to one or more particular categories of media content), media content formatting parameters (e.g., restricting searches to media content within the boundaries of one or more media content formats), geographical parameters (e.g., narrowing a field of search to a particular geographical region which may be defined by a radius of applicability), titling parameters (e.g., restricting searches from returning media content without title information), sorting parameters (e.g., governing the sorting of returned search results), restriction parameters (e.g., identifying addressing information that should be utilized to filter media content only available to certain individuals, countries, geographic regions, etc.), content parameters (e.g., restricting search results from returning media content associated with objectionable content), temporal parameters (e.g., narrowing search results to media content uploaded before, on, or after certain specified dates and/or times or within a range of dates and/or times), and the like. It is generally noted that one or more of these additional parameters may be included (or otherwise specified) based on query information provided to platform 200 by, for instance, a media application or may be based on user profile information stored to, for example, user profiles repository 131.

Once the query request is generated, query request module 209 may be configured, in step 1107, to initiate transmission of the generated query request to content provider system 105. For example, the query request may be initiated for transmission to the search API identified by the one or more URLs, URNs, CURIEs, XRIs, IRIs, etc. At step 1109, platform 200 may be configured to receive one or more search results in response to the query request. In certain embodiments, the search result(s) may be received as one or more HTTP GET responses. It is also contemplated that the query request may specify computing device 119 and/or content processing device 107 as the intended receiver of the one or more search results and, as such, the one or more search results may be directly transmitted to computing device 119 and/or content processing device 107. In the exemplary process of FIG. 11, however, platform 200 receives the one or more search results and, as such, may be configured to initiate transmission of the one or more search results to the media application that provided the query information and the authentication information to platform 200 or a media application specified to receive the one or more search results, per step 1111. According to exemplary embodiments, transmission of the one or more search results between platform 200 and the media application may be via one or more hypertext transfer protocol secure (HTTPS) communications.

Figure 12:
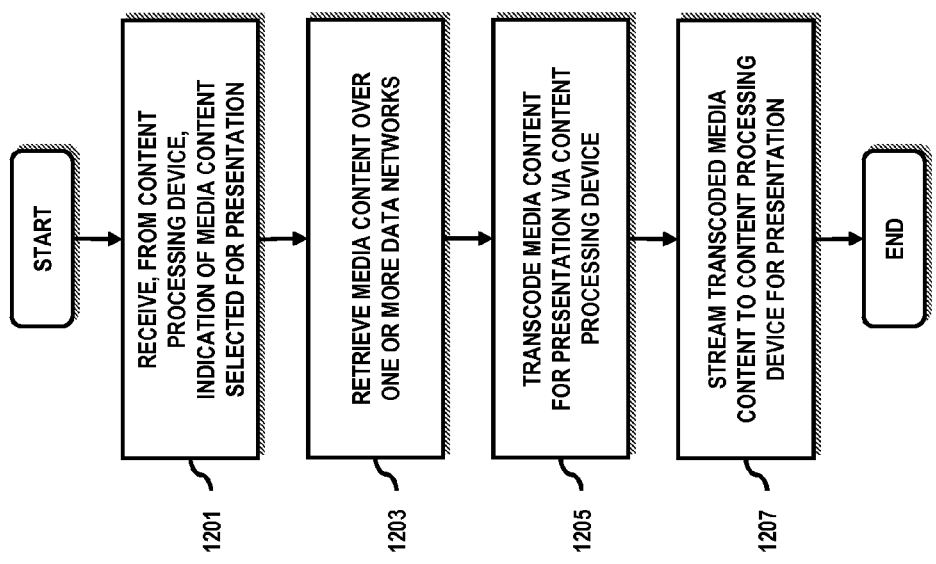
FIG. 12 is a flowchart of a process for retrieving and streaming media content for presentation via a content processing device, according to an exemplary embodiment.

As previously mentioned, user interaction with a particular search result may be configured to cause a media application to retrieve and stream media content associated with the particular search result for presentation via content processing device 107. FIG. 12 is a flowchart of a process for retrieving and streaming media content for presentation via a content processing device, according to an exemplary embodiment. For the purpose of illustration, the process is described with respect to FIGS. 1, 3, and 4. The process assumes that a user is interacting with one or more user interfaces associated with media manager 113, which is configured to utilize media agent 117 to retrieve, transcode, and stream media content to content processing device 300 for presentation to a user via, for instance, display 309 and audio system 321. It is noted, however, that all or certain functions of media manager 113 and/or media agent 117 may be performed by the correspondingly other media application, such that one or more of the media applications may be utilized to retrieve, transcode, stream, and/or present media content via content processing device 300. Further, the steps of the process may be performed in any suitable order, as well as combined or separated in any suitable manner.

At step 1201, media agent 117 receives, from content processing device 300, an indication of media content selected for presentation. For instance, media manager 113 may provide addressing or other identifying information to media agent 117 to enable content retrieval module 407 to retrieve content from, for instance, third-party content provider system 105. The indication may be based on user selection of a particular search result, such as search result 1023 of FIG. 10. Accordingly, in step 1203, content retrieval module 407 retrieves the associated media content from third-party content provider system 105 over one or more data networks 103. It is noted that content retrieval module 407 may be configured to transmit an HTTP GET request to one or more APIs 109 of third-party content provider system 105 at least specifying addressing information at which the media content may be located, such that the media content may be streamed to content retrieval module 407 by one or more APIs 109 of third-party content provider system 105 as, for example, a unicast transmission.

According to various exemplary embodiments, media agent 117 may be configured, via transcoding module 417, to transcode (or otherwise encode) the media content received from third-party content provider system 105 for presentation via content processing device 300, per step 1205. Thus, at step 1207, media agent 117 via, for instance, media server module 411, streams the transcoded media content to content processing device 300 for presentation via, for example, presentation module 327. It is noted that streaming cache module 415 may be utilized to cache transcoded media content before streaming the transcoded media content to content processing device 300 via media server module 417. In this manner, media content retrieved from third-party content provider system 105 may be streamed to content processing device 107 as it is being retrieved from third-party content provider system 105 and transcoded by transcoding module 417. Alternatively, media content retrieved by media content retrieval module 407 may be completely downloaded before transcoded and streamed to content processing device 300 for presentation via, for example, display 309 and/or audio system 321.

The processes described herein for providing content aggregation in support of virtual channels may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
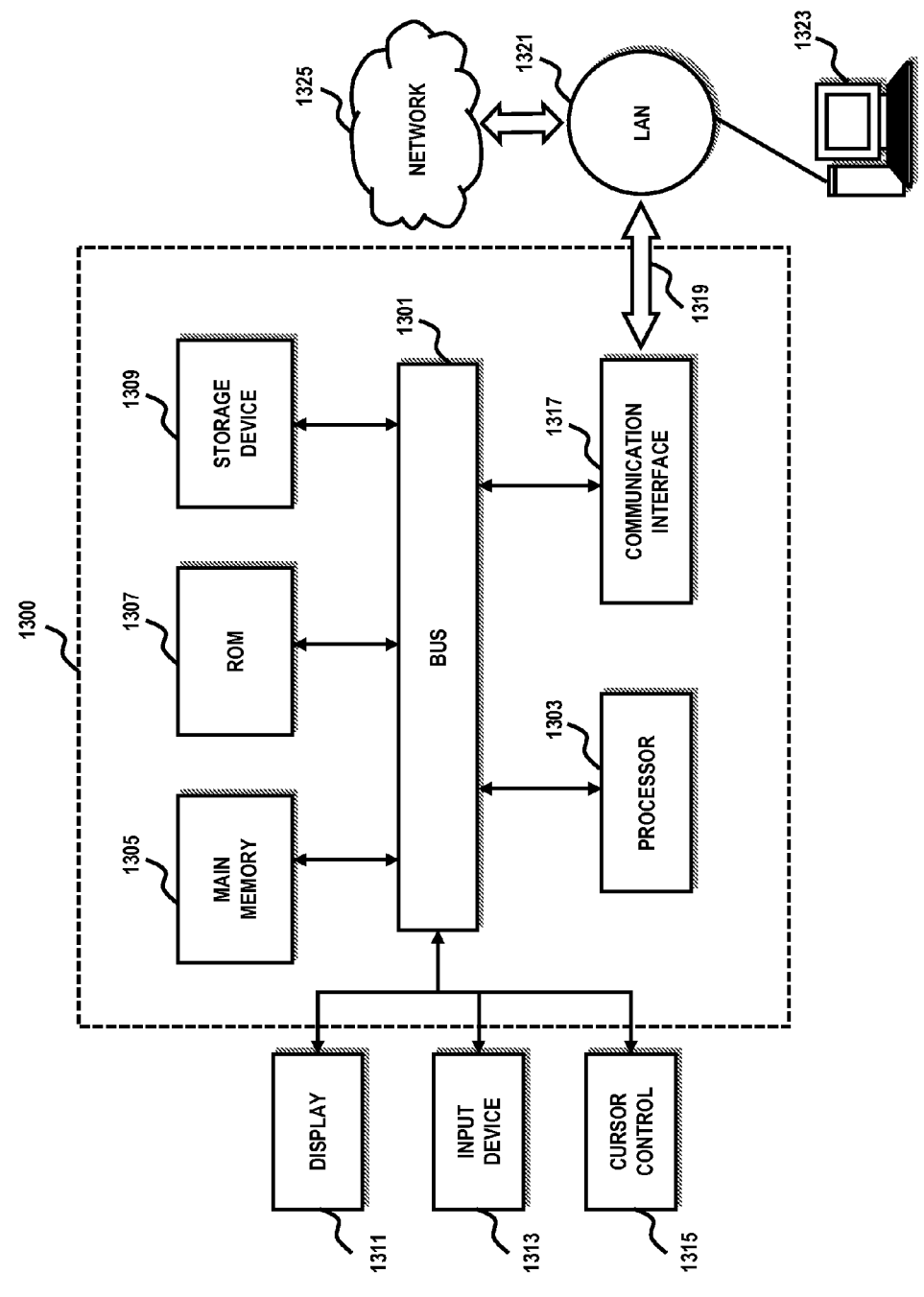
FIG. 13 is a diagram of a computer system that can be used to implement various exemplary embodiments.

FIG. 13 illustrates computing hardware (e.g., computer system) 1300 upon which an embodiment according to the invention can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to an embodiment of the invention, the processes described herein are performed by the computer system 1300, in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement the embodiment of the invention. Thus, embodiments of the invention are not limited to any specific combination of hardware circuitry and software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 13, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an embodiment of the invention through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1303 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving query information and authentication information of a user from a media application associated with a set-top box;
generating a query request for media content from a content provider system using the query information, the authentication information, and an identifier of a service provider;
initiating transmission of the query request to the content provider system;
receiving one or more search results in response to the query request; and
initiating transmission of the one or more search results to the media application,
wherein the user is a subscriber of the service provider and the content provider system is a third-party different from the service provider, and
wherein, the query request for media content from the content provider system is generated by a platform in communication with the set-top box and the content provider system.

2. A method according to claim 1, wherein the authentication information includes one or more of an authentication token, a username, a device identifier, and an encrypted device key.

3. A method according to claim 1, wherein the one or more search results at least include corresponding uniform resource locators specifying media content available from the content provider system.

4. A method according to claim 1, wherein transmission of the one or more search results to the media application is initiated as at least one hypertext transfer protocol secure communication.

5. A method according to claim 1, wherein transmission of the query request to the content provider system is initiated as at least one hypertext transfer protocol communication.

6. A method according to claim 1, wherein the media application is executed by a computing device communicatively coupled to the set-top box.

7. An apparatus comprising:
at least one processor; and
at least one memory including computer program code, the at least one memory and the computer program code being configured to, with the at least one processor, cause the apparatus at least to:
receive query information and authentication information of a user from a media application associated with a set-top box;
generate a query request for media content from a content provider system using the query information, the authentication information, and an identifier of a service provider;
initiate transmission of the query request to the content provider system;
receive one or more search results in response to the query request; and
initiate transmission of the one or more search results to the media application,
wherein the user is a subscriber of the service provider and the content provider system is a third-party different from the service provider, and
wherein, the query request for media content from the content provider system is generated by a platform in communication with the set-top box and the content provider system.

8. An apparatus according to claim 7, wherein the authentication information includes one or more of an authentication token, a username, a device identifier, and an encrypted device key.

9. An apparatus according to claim 7, wherein the one or more search results at least include corresponding uniform resource locators specifying media content available from the content provider system.

10. An apparatus according to claim 7, wherein transmission of the one or more search results to the media application is initiated as at least one hypertext transfer protocol secure communication.

11. An apparatus according to claim 7, wherein transmission of the query request to the content provider system is initiated as at least one hypertext transfer protocol communication.

12. An apparatus according to claim 7, wherein the media application is executed by a computing device communicatively coupled to the set-top box.

13. A non-transitory computer-readable medium at least including computer program code that, when executed by an apparatus, is at least configured to cause the apparatus at least to:
receive query information and authentication information of a user from a media application associated with a set-top box;
generate a query request for media content from a content provider system using the query information, the authentication information, and an identifier of a service provider;
initiate transmission of the query request to the content provider system;
receive one or more search results in response to the query request; and
initiate transmission of the one or more search results to the media application,
wherein the user is a subscriber of the service provider and the content provider system is a third-party different from the service provider, and
wherein, the query request for media content from the content provider system is generated by a platform in communication with the set-top box and the content provider system.

14. A non-transitory computer-readable medium according to claim 13, wherein the authentication information includes one or more of an authentication token, a username, a device identifier, and an encrypted device key.

15. A computer-readable medium according to claim 13, wherein the one or more search results at least include corresponding uniform resource locators specifying media content available from the content provider system.

16. A computer-readable medium according to claim 13, wherein transmission of the query request and the one or more search results to the media application is initiated as at least one hypertext transfer protocol secure communication.

17. A computer-readable medium according to claim 13, wherein the media application is executed by a computing device communicatively coupled to the set-top box.

* * * * *